United States Patent
Yamaguchi et al.

(10) Patent No.: US 11,133,878 B2
(45) Date of Patent: Sep. 28, 2021

(54) TOLL COLLECTION SYSTEM AND SOUNDNESS DETERMINATION METHOD

(71) Applicant: MITSUBISHI HEAVY INDUSTRIES MACHINERY SYSTEMS, LTD., Hyogo (JP)

(72) Inventors: Yasuhiro Yamaguchi, Tokyo (JP); Kenta Nakao, Tokyo (JP); Hiroyuki Nakayama, Tokyo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 403 days.

(21) Appl. No.: 15/998,638

(22) PCT Filed: Feb. 26, 2016

(86) PCT No.: PCT/JP2016/055790
§ 371 (c)(1),
(2) Date: Aug. 16, 2018

(87) PCT Pub. No.: WO2017/145354
PCT Pub. Date: Aug. 31, 2017

(65) Prior Publication Data
US 2021/0028874 A1    Jan. 28, 2021

(51) Int. Cl.
*G08G 1/00*       (2006.01)
*G08G 1/065*      (2006.01)
(Continued)

(52) U.S. Cl.
CPC ......... *H04B 17/318* (2015.01); *G07B 15/063* (2013.01); *H04B 7/26* (2013.01); *H04W 4/44* (2018.02)

(58) Field of Classification Search
CPC ...... H04B 17/318; H04B 7/26; G07B 15/063; H04W 4/44
(Continued)

(56) References Cited

U.S. PATENT DOCUMENTS

| 3,914,762 A * | 10/1975 | Klensch ............... H01Q 21/062 340/5.61 |
| 5,751,227 A | 5/1998 | Yoshida et al. |
| 2002/0032506 A1* | 3/2002 | Tokitsu .................. G08G 1/205 701/32.4 |

FOREIGN PATENT DOCUMENTS

| JP | 2003283403 A | 10/2003 |
| JP | 2005085046 A | 3/2005 |

(Continued)

OTHER PUBLICATIONS

International Search Report and Written Opinion for International Application No. PCT/JP2016/055790 dated May 31, 2016; 15 pp.

*Primary Examiner* — Tanmay K Shah
(74) *Attorney, Agent, or Firm* — Kanesaka Berner and Partners LLP

(57) ABSTRACT

A toll collection system is provided with: a roadside antenna that wirelessly communicates with an on-board device mounted in a vehicle; a wireless communication control device that carries out predetermined communication processing with the on-board device via the roadside antenna, acquiring toll collection information regarding the on-board device; and a confirmation apparatus that is disposed within a range in which wireless communication with the roadside antenna is possible, receiving a confirmation signal from the roadside antenna and transmitting a response signal.

7 Claims, 21 Drawing Sheets

(51) Int. Cl.
    *H04B 17/318*     (2015.01)
    *H04W 4/44*     (2018.01)
    *G07B 15/06*     (2011.01)
    *H04B 7/26*     (2006.01)

(58) Field of Classification Search
    USPC .......................................................... 340/928
    See application file for complete search history.

(56) References Cited

FOREIGN PATENT DOCUMENTS

| | | | |
|---|---|---|---|
| JP | 2005354465 | A | 12/2005 |
| JP | 2007052735 | A | 3/2007 |
| JP | 2008204026 | A | 9/2008 |

\* cited by examiner

TOLL COLLECTION SYSTEM AND SOUNDNESS DETERMINATION METHOD

RELATED APPLICATIONS

The present application is a National Phase of International Application Number PCT5P2016/055790 filed Feb. 26, 2016.

TECHNICAL FIELD

The present invention relates to a toll collection system and a soundness determination method.

BACKGROUND ART

Generally, an electronic toll collection system (ETC: Electronic Toll Collection System (trade name), also referred to as an "automatic toll collection system") is installed in toll gates with a start controller, etc. disposed therein. In contrast, the introduction of a free flow type electronic toll collection system for carrying out nonstop toll collection on vehicles driving on the main line of an expressway has recently been researched (for example, refer to Patent Document 1).

Upon entering existing toll gates, a user must normally decelerate, temporarily stop, etc. a vehicle. However, with a free flow type electronic toll collection system, a user need not decelerate, temporarily stop, etc. a vehicle, but rather allow communication between an on-board device and roadside equipment mounted on the vehicle simply by passing under a gantry at normal driving speed. Thereby, the effect of relieving traffic congestion, etc. is expected, further enhancing the convenience of expressways.

CITATION LIST

Patent Document

Patent Document 1: JP 2005-085046 A

SUMMARY OF INVENTION

Problem to be Solved by the Invention

In the abovementioned toll collection system, information for toll collection necessary for collecting tolls from each user (personal contract information, vehicle type information, etc. of an IC card) is generally acquired via communication between the on-board device and roadside equipment. Here, in a case where a period during which information for toll collection is not acquired continues in the toll collection system, a monitoring person of the toll collection system, etc. cannot immediately determine during the period whether vehicles have actually not passed or vehicles have passed but some abnormality in the system has prevented information for toll collection from being acquired.

It is contemplated that in the case of a free flow type toll collection system, in a case where the discovery and recovery of abnormalities is delayed, a large number of vehicles may pass during this time without being subjected to regular toll collection processing, thereby causing a great operational disadvantage.

In view of the abovementioned problems, the present invention provides a free flow type toll collection system which can detect abnormalities, along with a soundness determination method.

Solution to Problem

Toll collection system 1 according to one aspect of the present invention includes: roadside antennas 3a, 3b that wirelessly communicate with on-board device A1 mounted in vehicle A; wireless communication control devices 2a, 2b that carry out predetermined communication processing with the on-board device via the roadside antennas and acquire toll collection information regarding the on-board device; and confirmation apparatuses 4a, 4b that are disposed within a range in which wireless communication with the roadside antennas is possible, receiving a confirmation signal from the roadside antennas and transmitting a response signal, wherein the wireless communication control devices determine, based on the reception results of the response signal from the confirmation apparatus via the roadside antennas, whether the roadside antennas and the wireless communication control device are operating normally.

As a result, when the wireless communication control device transmits a confirmation signal, the confirmation apparatus permanently disposed within the communicable range thereof receives the confirmation signal and returns a response signal in accordance with the confirmation signal. Consequently, in accordance with the presence of the reception of a response signal from the confirmation apparatus, a determination can be made regarding whether the wireless communication control device and the roadside antenna are operating normally.

Moreover, according to one aspect of the present invention, in the abovementioned toll collection system, the confirmation apparatus is disposed within a range in which wireless communication with the roadside antenna via a side lobe (SL) of the roadside antenna is possible.

As a result, without influencing the main lobe of the roadside antenna itself, wireless communication processing between the roadside antenna and the confirmation apparatus can be stably carried out. Therefore, without impairing the stability of communication processing between the roadside antenna and the on-board device, a determination can be made regarding whether the wireless communication control device and the roadside antenna are operating normally.

Moreover, according to one aspect of the present invention, in the abovementioned toll collection system, the roadside antenna includes: antenna element 300a for transmitting and receiving radio waves with the on-board device; and radome 301 covering the antenna element, wherein the confirmation apparatus is disposed inside the radome.

As a result, the roadside antenna and the confirmation apparatus can be integrally formed, allowing the toll collection system to be simplified.

Moreover, according to one aspect of the present invention, in the abovementioned toll collection system, the confirmation apparatus transmits a response signal as the confirmation signal in a case were, during the communication processing, the wireless communication control device receives a predetermined request signal which is transmitted to the on-board device via the roadside antenna.

As a result, because the response signal from the confirmation apparatus is received using a request signal exchanged with the on-board device, the need for implementing a novel component in order to carry out wireless communication processing between the confirmation apparatus and the roadside antenna is eliminated, allowing a determination to be made regarding whether the roadside antenna is operating normally while suppressing increased production costs in the toll collection system.

Moreover, according to one aspect of the present invention, in the abovementioned toll collection system, the confirmation apparatus includes an identifier which can identify the fact that the transmission source of the response signal is the confirmation apparatus in the response signal, which is transmitted in a case where the request signal is received.

As a result, the wireless communication control device can determine, only by referring to an identifier read from the response signal, whether the response signal has been transmitted from the confirmation apparatus.

Moreover, according to one aspect of the present invention, in the abovementioned toll collection system, the wireless communication control device includes: reception strength acquisition unit 202 for acquiring reception strength information indicating the reception strength of radio waves received by the roadside antenna; and radio wave receiving soundness determination unit 203 for determining whether the roadside antenna is operating normally based on whether the reception strength of radio waves indicated in the reception strength information is lower than a predetermined reception determination threshold.

As a result, the wireless communication control device can determine whether the roadside antenna is operating normally not only based on the presence of the reception of the response signal from the confirmation apparatus but also based on the reception strength of radio waves (as the reception results thereof) overlapped by the response signal. Consequently, the locations of operation abnormalities in the toll collection system can be further narrowed down and specified.

In a soundness determination method according to one aspect of the present invention for determining the soundness of a toll collection system, the toll collection system includes: a roadside antenna that wirelessly communicates with an on-board device mounted in a vehicle; and a wireless communication control device that carries out predetermined communication processing with the on-board device via the roadside antenna, acquiring toll collection information regarding the on-board device, wherein the method includes the steps of: disposing, within a range in which wireless communication with the roadside antenna is possible, a confirmation apparatus that receives a confirmation signal from the roadside antenna and transmits a response signal; and determining, based on the reception results of the response signal from the confirmation apparatus via the roadside antenna, whether the roadside antenna and the wireless communication control device are operating normally.

Advantageous Effect of Invention

The abovementioned toll collection system and soundness determination method enable the provision of a free flow type toll collection system which can detect abnormalities.

DESCRIPTION OF EMBODIMENTS

Embodiment 1

Hereinafter, a toll collection system according to Embodiment 1 will be described in detail with reference to FIGS. 1 to 6.

Overall Configuration of the Toll Collection System

Figure 1:
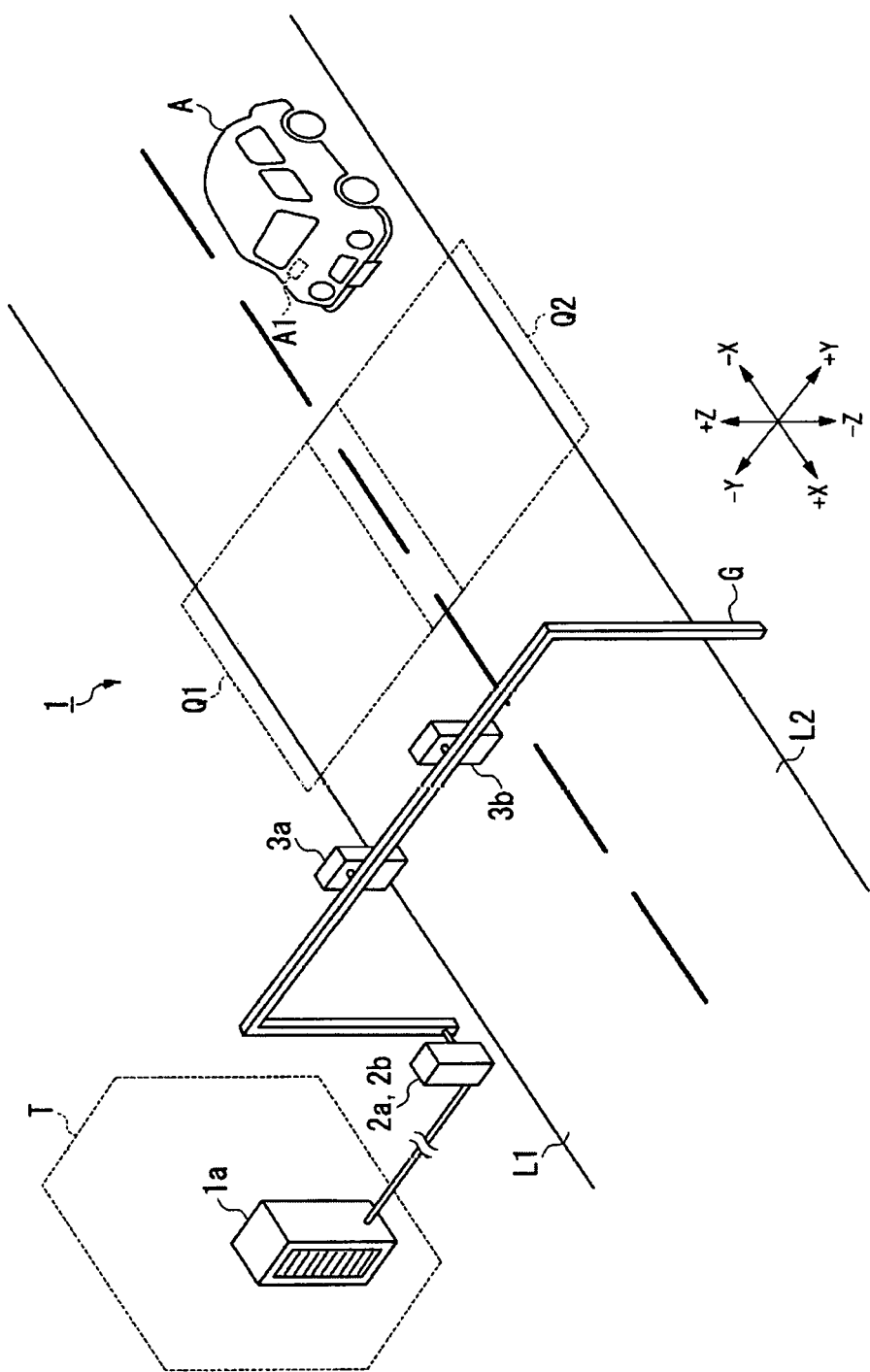
FIG. 1 is a diagram illustrating the overall configuration of a toll collection system according to Embodiment 1.

FIG. 1 is a diagram illustrating the overall configuration of a toll collection system according to Embodiment 1.

Toll collection system 1 according to the present embodiment is a free flow type electronic toll collection system installed on the main line of an expressway (hereinafter, also described as a "main road") including two lanes L1, L2.

As illustrated in FIG. 1, toll collection system 1 carries out communication processing for toll collection with on-board device A1 mounted in vehicle A while driving on main roads (lanes L1, L2) and executes toll collection processing on users boarding this vehicle A.

As illustrated in FIG. 1, toll collection system 1 includes toll collection processing device 1a, wireless communication control devices 2a, 2b, and roadside antennas 3a, 3b.

As illustrated in FIG. 1, toll collection processing device 1a is installed in communication tower T distant from main roads (lanes L1, L2).

Wireless communication control devices 2a, 2b are installed on the roadside of lanes L1, L2 and in the vicinity of gantry G. Wireless communication control devices 2a, 2b respectively carry out communication processing with on-board device A1 via roadside antennas 3a, 3b to acquire information for toll collection.

Roadside antennas 3a, 3b are attached to gantry G, which is disposed across the lane width direction of lanes L1, L2 (±Y direction of FIG. 1) and fixed over each of lanes L1, L2.

Toll collection processing device 1a and wireless communication control devices 2a, 2b, as well as wireless communication control devices 2a, 2b and roadside antennas 3a, 3b, are connected via wires (the below-mentioned optical cables, Ethernet (registered trademark) cables).

Roadside antennas 3a, 3b are interfaces for wireless communication which wirelessly communicate with on-board device A1 via radio waves.

Roadside antenna 3a wirelessly communicates with on-board device A1 present within a range of specified communication region Q1 prespecified on the road surface of lane L1. That is, communication processing is carried out on vehicle A driving on lane L1 via roadside antenna 3a. Moreover, roadside antenna 3b wirelessly communicates with on-board device A1 present within a range of specified communication region Q2 prespecified on the road surface of lane L2. That is, communication processing is carried out on vehicle A driving on lane L2, via roadside antenna 3b.

In this way, the present embodiment is an aspect in which communication processing for toll collection is carried out on each vehicle A driving on two lanes L1, L2 via each of two roadside antennas 3a, 3b.

Note that other embodiments are not limited to the abovementioned aspect and, for example, may include an aspect in which one roadside antenna is disposed on main roads including two lanes L1, L2. In this case, this one roadside antenna sets the specified communication region including the road surfaces of both lanes L1, L2.

Moreover, other embodiments may include an aspect in which one or two or more roadside antennas is/are disposed on main roads including three or more lanes.

Functional Elements of the Toll Collection System

Figure 2:
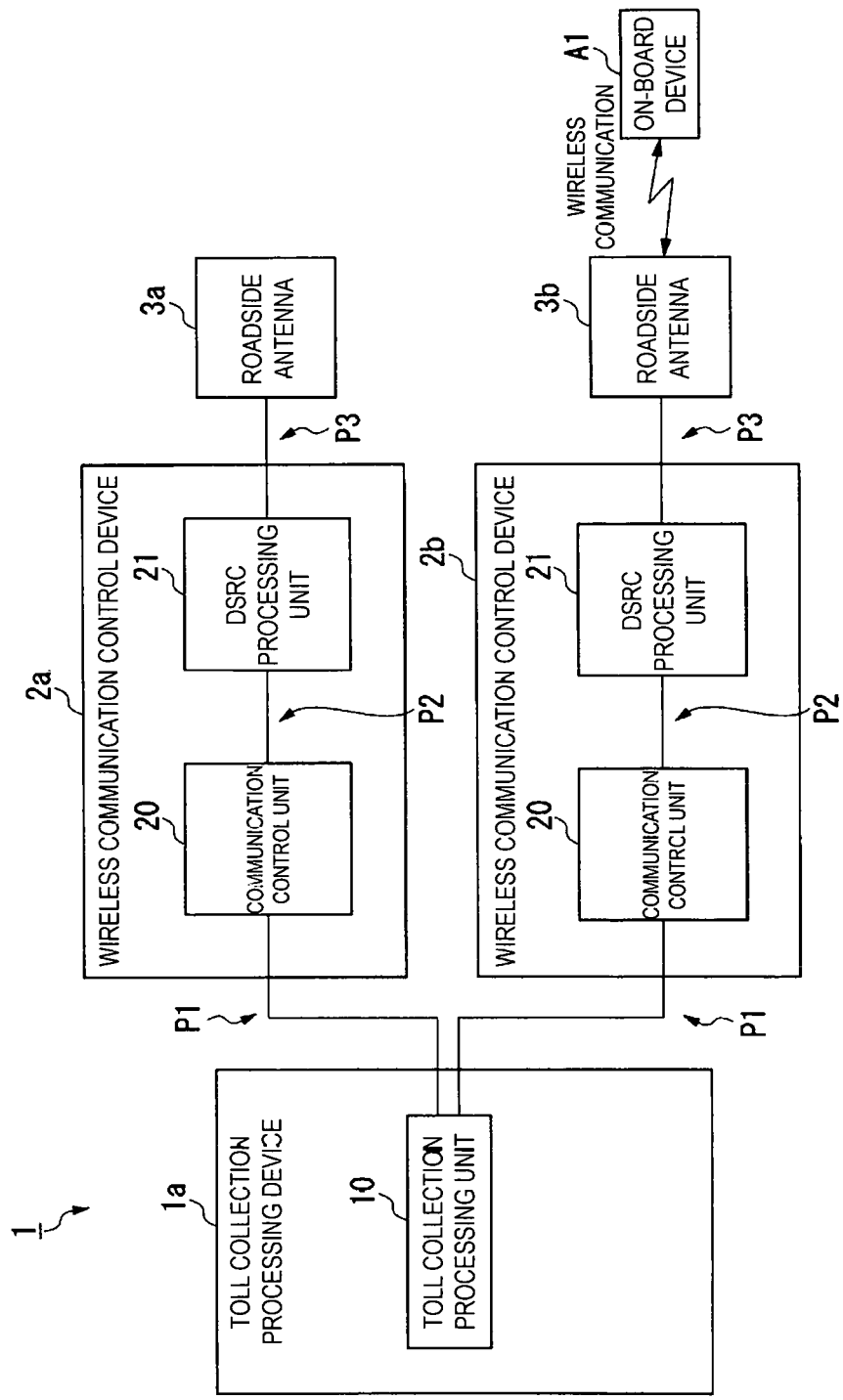
FIG. 2 is a diagram illustrating the functional elements of the toll collection system according to Embodiment 1.

FIG. 2 is a diagram illustrating the functional elements of the toll collection system according to Embodiment 1.

As illustrated in FIG. 2, toll collection processing device 1a of toll collection system 1 includes toll collection processing unit 10.

Toll collection processing unit 10 collects information for toll collection acquired via communication processing with on-board device A1 from wireless communication control devices 2a, 2b and carries out toll collection processing on users of an expressway based on this information for toll collection.

Moreover, as illustrated in FIG. 2, each of wireless communication control devices 2a, 2b includes communication control unit 20 along with DSRC processing unit 21 (communication processing unit).

Communication control unit 20 is a processor controlling the operation of overall wireless communication control devices 2a, 2b. In particular, communication control unit 20 controls the operation of this DSRC processing unit 21 as a host controller of the below-mentioned DSRC processing unit 21. Specifically, communication control unit 20 acquires a variety of information received via communication processing between DSRC processing unit 21 and on-board device A1. In addition, communication control unit 20 summarizes the variety of acquired information and creates information for toll collection with regard to on-board device A1 serving as the communication target of this DSRC processing unit 21.

DSRC processing unit 21 carries out communication processing with on-board device A1 via roadside antennas 3a, 3b based on predetermined communication specifications. Here, in the present embodiment, predetermined communication specifications are ARIB (Association of Radio Industries and Businesses) standard specifications, which are the standard communication specifications of dedicated short-range communication (DSRC) systems.

DSRC processing unit 21 acquires the variety of information recorded in the internal memory of on-board device A1, etc. via dedicated short-range communication (DSRC) processing with on-board device A1 based on the ARIB specifications and outputs it to communication control unit 20.

In the present embodiment, roadside antenna 3a and DSRC processing unit 21 of wireless communication control device 2a, as well as roadside antenna 3b and DSRC processing unit 21 of wireless communication control device 2b, are connected to optical cables in which high speed data communication is possible.

Moreover, in the present embodiment, communication control unit 20 of wireless communication control device 2a, as well as communication control unit 20 of wireless communication control device 2b, is connected to toll collection processing unit 10 of toll collection processing device 1a installed in communication tower T (FIG. 1) via Ethernet (trade name) cables.

However, other embodiments are not limited to the abovementioned aspect and may include an aspect of connection via communication cables other than optical cables and Ethernet (trade name) cables.

Note that in the present embodiment, in wireless communication control device 2a, DSRC processing unit 21 and communication control unit 20 are bus connected on the same circuit substrate. Similarly, in wireless communication control device 2b, DSRC processing unit 21 and communication control unit 20 are bus connected on the same circuit substrate.

Note that as illustrated in FIG. 1, while the present embodiment has been described as an aspect in which wireless communication control devices 2a, 2b are installed on the roadside of lanes L1, L2 and in the vicinity of gantry G, other embodiments are not limited to this aspect. For example, they may include an aspect in which wireless communication control devices 2a, 2b are installed in communication tower T (FIG. 1). In this case, roadside antennas 3a, 3b and wireless communication control devices 2a, 2b (DSRC processing units 21) are connected via optical cables wired from gantry G to communication tower T, etc.

Note that in the following description, a pair of communication control unit 20 and toll collection processing unit 10 is also written as "communication pair P1", a pair of DSRC processing unit 21 and communication control unit 20 is also written as "communication pair P2", and a pair of roadside antennas 3a, 3b and DSRC processing unit 21 is also written as "communication pair P3".

Functions of the DSRC Processing Unit

Figure 3:
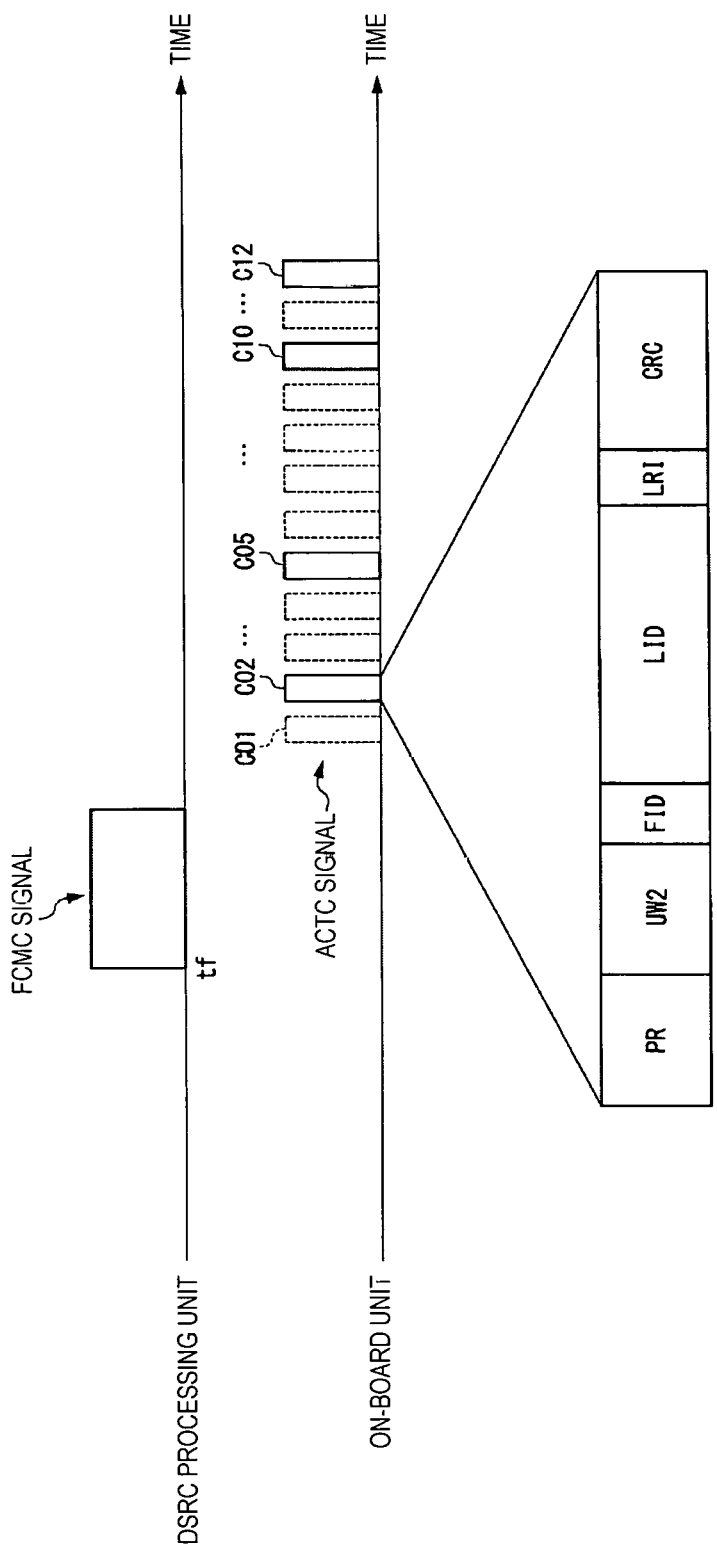
FIG. 3 is a drawing explaining the functions of a DSRC processing unit according to Embodiment 1.

FIG. 3 is a drawing explaining the functions of a DSRC processing unit according to Embodiment 1.

FIG. 3 illustrates an aspect of part of the dedicated short-range communication processing carried out between on-board device A1 and DSRC processing unit 21.

For example, DSRC processing unit 21 (FIG. 2) provided in wireless communication control device 2a transmits a "FCMC signal" (frame control message channel signal) based on the ARIB standard specifications via roadside antenna 3a (or roadside antenna 3b) through radio waves at certain time of day tf.

In a case where on-board device A1 mounted in vehicle A in driving on lane L1 (or lane L2) receives radio waves overlapped by this FCMC signal, in response to the received FCMC signal, it similarly transmits (returns) an "ACTC signal" (activation channel signal) based on the ARIB standard specifications through radio waves.

Moreover, in the abovementioned ARIB standard specifications, on-board device A1 which has received the FCMC signal transmits the ACTC signal through radio waves at the timing of receiving the FCMC signal as the reference timing, along with the timing corresponding to any one of 12 channels (channels C01 to C12 illustrated in FIG. 3) specified in different periods beforehand.

The timing at which on-board device A1 transmits the ACTC signal (channels C01 to C12) is randomly selected for each transmission thereof. Thereby, for example, in the same specified communication region Q1, in a case where multiple vehicles A (on-board devices A1) have simultaneously received the FCMC signal, interference of the overlapped transmission timing of the ACTC signal transmitted from each of these multiple on-board devices A1 can be suppressed.

For example, in the example illustrated in FIG. 3, the ACTC signal from four different on-board devices A1 is transmitted in the four periods of channels C02, C05, C10, C12.

Moreover, as illustrated in FIG. 3, in the ARIB standard specifications, the ACTC signal is configured such that a variety of information such as PR (preamble), UW2 (unique word), LID (link ID), and CRC is regularly arranged.

Here, PR is information assigned to the head of the ACTC signal and is also a data sequence disposed to be synchronized with reception processing on the reception side (DSRC processing unit 21). Moreover, UW2 is a data sequence for identifying the kind of signal including this UW2. UW2 contained in the ACTC signal includes information indicating that this signal is an "ACTC signal". Moreover, the LID includes identification information inherently allocated in on-board device A1 serving as the transmission source. Moreover, CRC is a data sequence in accordance with information (arrangement pattern) of the ACTC signal to be transmitted and is also information assigned to determine the presence of data damage received by the reception source.

In a case where DSRC processing unit 21 accepts the ACTC signal and specifies on-board device A1 which should be the communication target, it establishes a data link with this specified on-board device A1. Subsequently, DSRC processing unit 21 continues further mutual communication with on-board device A1 and acquires a variety of information (personal contract information, vehicle number information, vehicle type information, entrance information, etc.), which is information necessary for toll collection recorded in on-board device A1. In addition, DSRC processing unit 21 outputs, to communication control unit 20, the abovementioned variety of information acquired as a result of dedicated short-range communication processing.

Communication control unit 20 summarizes the abovementioned variety of information acquired from DSRC processing unit 21 as information for toll collection with regard to on-board device A1 serving as the communication target of DSRC and outputs the information to toll collection processing unit 10.

Functional Elements of the Wireless Communication Control Device

Figure 4:
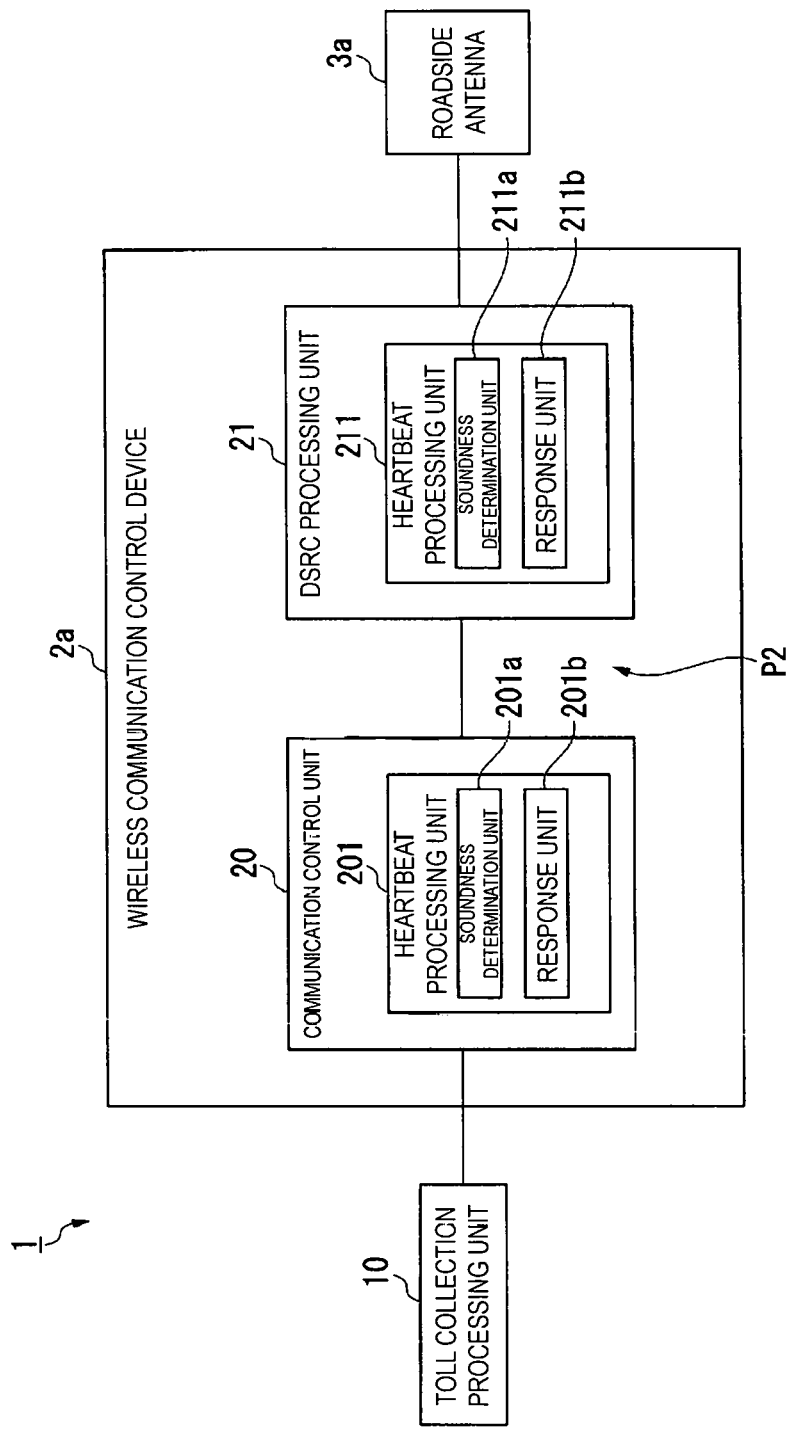
FIG. 4 is a diagram illustrating the functional elements of a wireless communication control device according to Embodiment 1.

FIG. 4 is a diagram illustrating the functional elements of a wireless communication control device according to Embodiment 1.

In FIG. 4, detailed functional elements regarding wireless communication control device 2a are illustrated. Note that the functional elements of wireless communication control device 2b are the same as those of wireless communication control device 2a.

As illustrated in FIG. 4, communication control unit 20 and DSRC processing unit 21 respectively include heartbeat processing units 201, 211.

Moreover, heartbeat processing unit 211 of DSRC processing unit 21 includes soundness determination unit 211a along with response unit 211b. Similarly, heartbeat processing unit 201 of communication control unit 20 includes soundness determination unit 201a along with response unit 201b.

Soundness determination unit 211a of DSRC processing unit 21 outputs a predetermined confirmation signal (first confirmation signal) to communication control unit 20 and determines whether communication control unit 20 is operating normally based on whether the input of a predetermined response signal (first response signal) associated with this first confirmation signal has been accepted.

Here, in the present embodiment, for example, "associated with" indicates that the same signal identifier as the inherent signal identifier assigned to the first confirmation signal is assigned in the first response signal. As a result, the transmission side (soundness determination unit 211a) of the first confirmation signal can identify whether the received response signal is a return signal to the first confirmation signal output by itself.

Moreover, soundness determination unit 201a of communication control unit 20 outputs a predetermined confirmation signal (second confirmation signal) to DSRC processing unit 21 and determines whether DSRC processing unit 21 is operating normally based on whether the input of a predetermined response signal (second response signal) associated with this second confirmation signal has been accepted.

Moreover, in a case where response unit 211b of DSRC processing unit 21 has accepted the input of the second confirmation signal from soundness determination unit 201a, response unit 211b outputs a second response signal associated with this second confirmation signal to communication control unit 20.

Moreover, in a case where response unit 201b of communication control unit 20 has accepted the input of the first confirmation signal from soundness determination unit 211a, response unit 201b outputs a first response signal associated with this first confirmation signal to DSRC processing unit 21.

In this way, in toll collection system 1 according to the present embodiment, each component (communication control unit 20 and DSRC processing unit 21) configuring communication pair P2 mutually exchanges confirmation signals (a first confirmation signal and a second confirmation signal) and response signals (a first response signal and a second response signal) and determines their mutual soundness.

Note that in this case, the first component configuring communication pair P2 is one of communication control unit 20 or DSRC processing unit 21, while the second component configuring communication pair P2 is the other communication control unit 20 or DSRC processing unit 21.

Processing Flow of the Communication Control Unit and the DSRC Processing Unit

Figure 5:
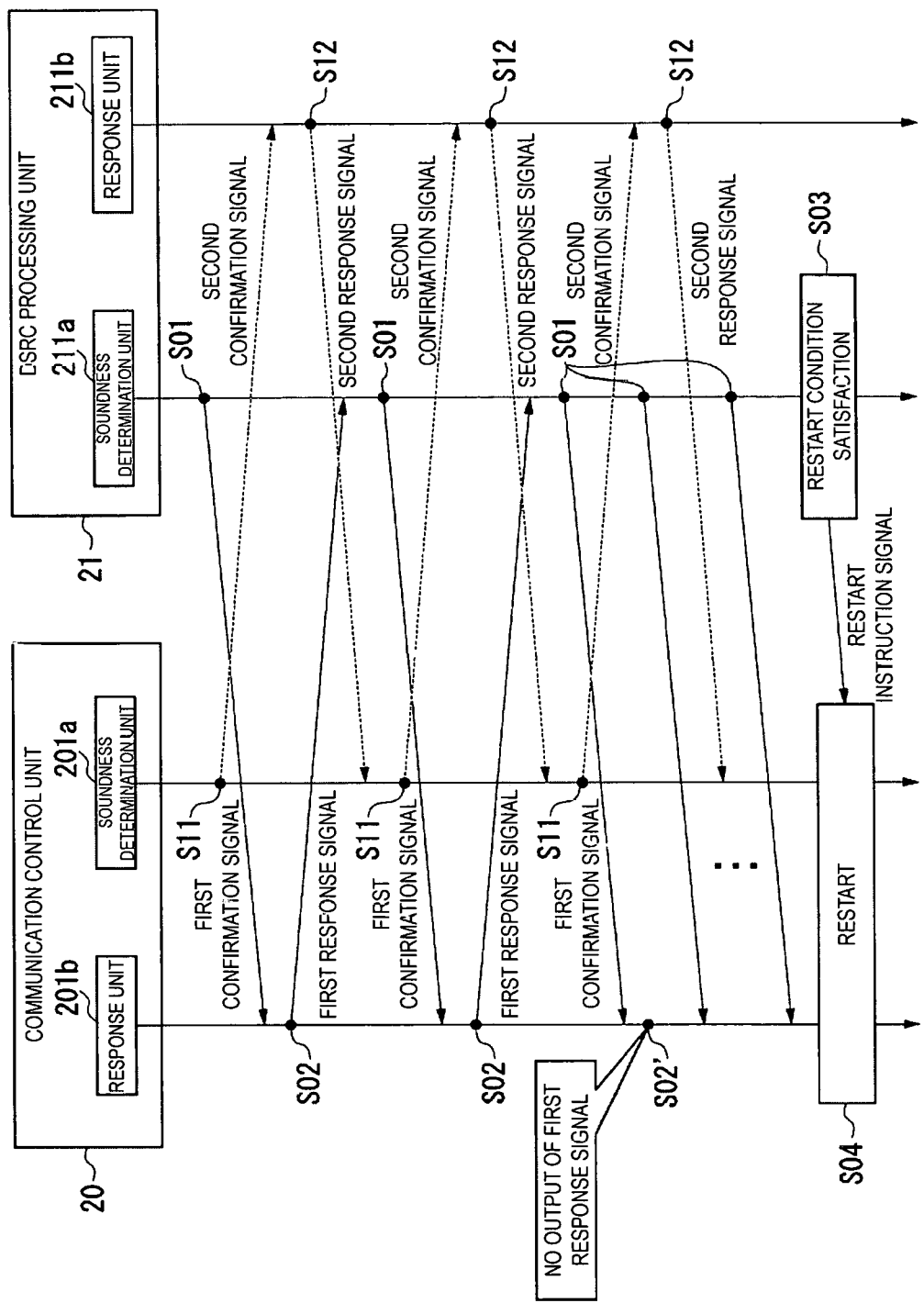
FIG. 5 is a diagram illustrating the processing flow of a communication control unit and the DSRC processing unit according to Embodiment 1.

FIG. 5 is a diagram illustrating the processing flow of a communication control unit and the DSRC processing unit according to Embodiment 1.

As illustrated in FIG. 5, soundness determination unit 211*a* of DSRC processing unit 21 outputs the first confirmation signal to communication control unit 20 (Step S01). Response unit 201*b* of communication control unit 20 which accepts the input of the first confirmation signal immediately outputs the first response signal associated with this first confirmation signal to DSRC processing unit 21 (Step S02). If soundness determination unit 211*a* accepts the input of the first response signal associated with the first confirmation signal, soundness determination unit 211*a* determines that communication control unit 20 is operating normally and again outputs the first confirmation signal after a constant time has elapsed (Step 01).

In this way, soundness determination unit 211*a* of DSRC processing unit 21, as well as response unit 201*b* of communication control unit 20, constantly and repeatedly execute the processing of Steps S01 and S02.

In contrast, soundness determination unit 201*a* of communication control unit 20 outputs the second confirmation signal to DSRC processing unit 21 (Step S11). Response unit 211*b* of DSRC processing unit 21 which accepts the input of the second confirmation signal immediately outputs the second response signal associated with this second confirmation signal to communication control unit 20 (Step S12). If soundness determination unit 201*a* accepts the input of the second response signal associated with the second confirmation signal, soundness determination unit 201*a* determines that DSRC processing unit 21 is operating normally and again outputs the second confirmation signal after a constant time has elapsed (Step 11).

In this way, soundness determination unit 201*a* of communication control unit 20, as well as response unit 211*b* of DSRC processing unit 21, constantly and repeatedly execute the processing of Steps S11 and S12.

Here, the flow of processing in which abnormalities have occurred in the operation of communication control unit 20 at a certain timing will be described.

In this case, after the timing in which abnormalities have occurred, response unit 201*b* of communication control unit 20 does not output the first response signal from soundness determination unit 211*a* to the first confirmation signal (Step S02').

Soundness determination unit 211*a* detects the absence of the input of the first response signal, despite the output of the first confirmation signal, and counts the number of occurrences of this event. In addition, once the number of occurrences of the event of "the absence of the input of the first response signal despite the output of the first confirmation signal" reaches a predetermined number, soundness determination unit 211*a* determines that communication control unit 20 is not operating normally.

In this case, soundness determination unit 211*a* further determines that the restart conditions of communication control unit 20 are satisfied and outputs a restart instruction signal to communication control unit 20 (Step S03). If communication control unit 20, which has been determined to be in an abnormal state, accepts this restart instruction signal, communication control unit 20 immediately executes restart processing (Step S04). Upon the completion of restart processing, communication control unit 20 recovers from the abnormal state and operates normally.

Note that the flow of processing for the case in which abnormalities have occurred in the operation of communication control unit 20 has been described above, with the same applying to the flow of processing for the case in which abnormalities have occurred in the operation of DSRC processing unit 21. That is, once the number of occurrences of the event of "the absence of the input of the second response signal despite the output of the second confirmation signal" reaches a predetermined number, soundness determination unit 201*a* of communication control unit 20 determines that DSRC processing unit 21 is not operating normally and executes restart processing of DSRC processing unit 21.

Operational Effects

As described above, toll collection system 1 according to Embodiment 1 includes: roadside antennas 3*a*, 3*b* which wirelessly communicate with on-board device A1 mounted in vehicle A; DSRC processing unit 21 for carrying out dedicated short-range communication processing based on predetermined communication specifications (ARIB standard specifications) with on-board device A1 via roadside antennas 3*a*, 3*b*; communication control unit 20 for acquiring the results of the dedicated short-range communication processing based on the ARIB standard specifications from DSRC processing unit 21 and creating information for toll collection with regard to on-board device A1; and toll collection processing unit 10 for accepting the input of information for toll collection from communication control unit 20 and carrying out toll collection processing based on this information for toll collection.

Moreover, in toll collection system 1 according to Embodiment 1, in a case where communication control unit 20 serving as one configuring communication pair P2 (FIG. 2) accepts the input of the first confirmation signal from DSRC processing unit 21, communication control unit 20 includes response unit 201*b* for outputting a predetermined response signal associated with this first confirmation signal.

In addition, DSRC processing unit 21 serving as the other configuring communication pair P2 includes soundness determination unit 211*a* for outputting the first confirmation signal to communication control unit 20 and determining whether communication control unit 20 is operating normally based on whether the input of a first response signal associated with this first confirmation signal has been accepted.

In this way, soundness determination unit 211*a*, via the confirmation signal and the response signal, regularly determines the soundness of communication control unit 20 serving as a communication partner (whether communication control unit 20 is operating normally). Therefore, in a case where abnormalities have occurred in this communication control unit 20, the abnormalities can be immediately detected.

Consequently, in accordance with toll collection system 1 according to Embodiment 1, in a free flow type toll collection system, abnormalities can be quickly and accurately detected.

Moreover, in a case where toll collection processing unit 10 with information for toll collection collected is "upstream" with respect to roadside antennas 3*a*, 3*b* which wirelessly communicate with on-board device A1, in toll collection system 1 according to the present embodiment, a component (DSRC processing unit 21) located on the downstream side carries out heartbeat processing (outputs the confirmation signal and confirms the presence of a response signal) on a component (communication control unit 20) located on the upstream side in order to determine the soundness of this component on the upstream side.

Here, for example, the case is contemplated in which toll collection processing unit 10 located on the upstream side of communication control unit 20 carries out heartbeat processing on this communication control unit 20. In this case, toll collection processing unit 10 located on the upstream side needs to output the confirmation signal to each of multiple (two) communication control units 20 (communication control units 20 provided in wireless communication control devices 2*a*, 2*b*) located on the downstream side. Moreover, toll collection processing unit 10 located on the upstream side accepts the input of the response signal from each of multiple communication control units 20 located on the downstream side. Therefore, in toll collection processing unit 10, the time capable of being assigned to heartbeat processing to one communication control unit 20 decreases, prolonging the time interval. Moreover, in the present embodiment, the physical distance from toll collection processing unit 10 to communication control unit 20 is long, with relatively long Ethernet (trade name) cables wired and connected.

Due to the above factors, in a case where toll collection processing unit 10 carries out heartbeat processing on communication control unit 20, abnormalities occurring in this communication control unit 20 may be unable to be quickly detected.

In contrast, compared with toll collection processing unit 10, processing which should be carried out by DSRC processing unit 21 is simpler and operable at a higher speed, with a shorter distance of processing unit 21 and communication control unit 20. Therefore, as in the present embodiment, when DSRC processing unit 21 located on the downstream side carries out heartbeat processing on communication control unit 20 and abnormalities have occurred in this communication control unit 20, the abnormalities can be more quickly detected.

Moreover, in the present embodiment, DSRC processing unit 21 further includes response unit 211*h* for outputting the second response signal associated with the second confirmation signal if the input of this second confirmation signal from communication control unit 20 has been accepted. Moreover, communication control unit 20 includes soundness determination unit 201*a* for outputting the second confirmation signal to DSRC processing unit 21 and determining whether DSRC processing unit 21 is operating normally based on whether the input of a second response signal associated with this second confirmation signal has been accepted.

As a result, because communication control unit 20 and DSRC processing unit 21 mutually execute heartbeat processing and confirm their mutual soundness, in a case where abnormalities have occurred in either communication control unit 20 or DSRC processing unit 21, the abnormalities can be detected and the occurrence locations of the abnormalities can be specified.

Moreover, in a case where soundness determination units 211*a*, 201*a* according to the present embodiment determine the target components (communication control unit 20 and DSRC processing unit 21) are not operating normally, soundness determination units 211*a*, 201*a* instruct the restart of the target components.

As a result, in a case where abnormalities are detected in each component configuring toll collection system 1, because this detected component is immediately restarted, the abnormalities of toll collection system 1 can be more quickly recovered.

In the foregoing, toll collection system 1 according to Embodiment 1 has been described in detail. However, specific aspects of toll collection system 1 according to Embodiment 1 are not limited to those described above, with various design modifications, for example, capable of being made without departing from the gist thereof.

Modified Example of Embodiment 1

Figure 6:
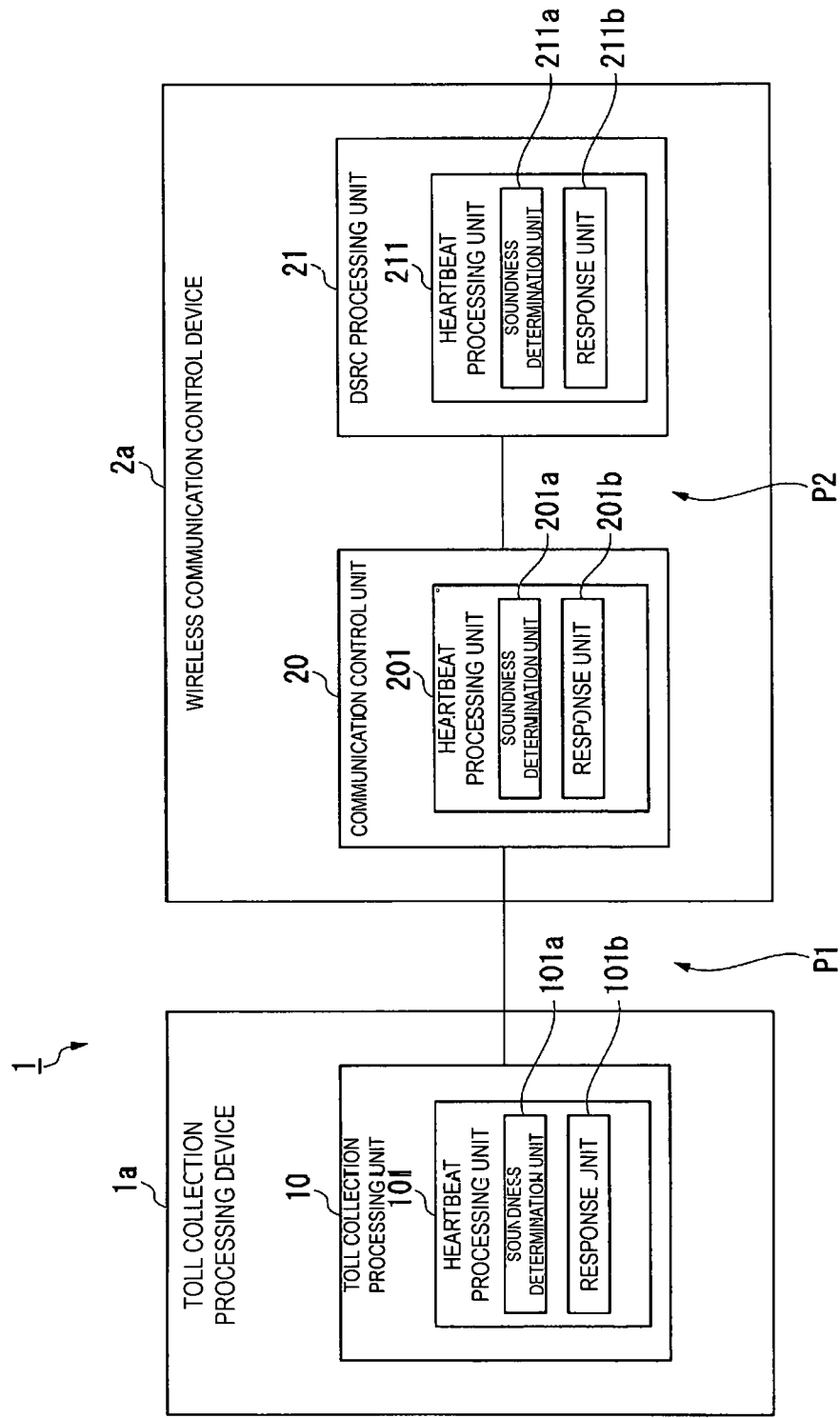
FIG. 6 is a diagram illustrating the functional elements of a toll collection system according to a modified example of Embodiment 1.

FIG. 6 is a diagram illustrating the functional elements of a toll collection system according to a modified example of Embodiment 1.

As illustrated in FIG. 6, toll collection processing unit 10 of toll collection processing device 1*a* according to the present modified example includes heartbeat processing unit 101. Moreover, heartbeat processing unit 101 of toll collection processing unit 10 includes soundness determination unit 101*a* along with response unit 101*b*.

Soundness determination unit 101*a* of toll collection processing unit 10 outputs a predetermined confirmation signal (third confirmation signal) to communication control unit 20 and determines whether communication control unit 20 is operating normally based on whether the input of a predetermined response signal (third response signal) associated with the third confirmation signal has been accepted.

Moreover, soundness determination unit 201*a* of communication control unit 20 further outputs a predetermined confirmation signal (fourth confirmation signal) to toll collection processing unit 10, and determines whether toll collection processing unit 10 is operating normally based on whether the input of a predetermined response signal (fourth response signal) associated with the fourth confirmation signal has been accepted.

Moreover, in a case where response unit 101*b* of toll collection processing unit 10 accepts the input of the fourth confirmation signal from soundness determination unit 201*a*, response unit 101*b* outputs a fourth response signal associated with this fourth confirmation signal to communication control unit 20.

Moreover, in a case where response unit 201*b* of communication control unit 20 accepts the input of the third confirmation signal from soundness determination unit 101*a*, response unit 201*b* outputs a third response signal associated with this third confirmation signal to toll collection processing unit 10.

In this way, in toll collection system 1 according to the present modified example, each component (toll collection processing unit 10 and communication control unit 20) configuring communication pair P1 mutually exchanges confirmation signals (a third confirmation signal and a fourth confirmation signal) and response signals (a third response signal and a fourth response signal) and determines their mutual soundness.

Note that in this case, the first component configuring communication pair P1 is one of toll collection processing unit 10 or communication control unit 20, while the second component configuring communication pair P1 is the other toll collection processing unit 10 or communication control unit 20.

As a result, because soundness determination unit 201a of communication control unit 20 regularly determines, via the confirmation signal and the response signal, the soundness of toll collection processing unit 10 serving as a communication partner, in a case where abnormalities occur in this toll collection processing unit 10, soundness determination unit 201a can immediately detect these abnormalities.

Further, because soundness determination unit 101a of toll collection processing unit 10 regularly determines, via the confirmation signal and the response signal, the soundness of communication control unit 20 serving as a communication partner, in the case where abnormalities occur in this toll collection processing unit 10, soundness determination unit 101a can immediately detect these abnormalities.

Therefore, abnormalities of toll collection system 1 can be further quickly and accurately detected.

Moreover, while toll collection system 1 according to the abovementioned modified example has been described as an aspect including heartbeat processing unit 101 in toll collection processing unit 10, other embodiments are not limited to this aspect.

For example, toll collection system 1 according to still another modified example may include an aspect in which each component (DSRC processing unit 21 and roadside antennas 3a, 3b) configuring communication pair P3 mutually exchanges confirmation signals and response signals and determines their mutual soundness.

Specifically, roadside antennas 3a, 3b may include heartbeat processing units (a soundness determination unit and a response unit). In this case, the soundness determination units of roadside antennas 3a, 3b output the confirmation signal to DSRC processing unit 21. In addition, the soundness determination units of roadside antennas 3a, 3b determine the soundness of DSRC processing unit 21 based on whether they have input the response signal from DSRC processing unit 21.

Moreover, in a case where the response units of roadside antennas 3a, 3b have accepted the input of the confirmation signal from DSRC processing unit 21, the response units output the response signal associated with this confirmation signal to DSRC processing unit 21.

Note that in this case, the first component configuring communication pair P3 is one of either DSRC processing unit 21 or roadside antennas 3a, 3b, while the second component is the other DSRC processing unit 21 or roadside antennas 3a, 3b.

Moreover, toll collection system 1 according to the abovementioned Embodiment 1 has been described such that both components (communication control unit 20 and DSRC processing unit 21) configuring communication pair P2 mutually carry out heartbeat processing. However, other embodiments are not limited to this aspect, with an aspect capable of being used in which heartbeat processing is carried out from one of either communication control unit 20 or DSRC processing unit 21 to the other.

Specifically, for example, DSRC processing unit 21 only includes soundness determination unit 211a, while communication control unit 20 only includes response unit 201b. In this case, in communication pair P2, only heartbeat processing from DSRC processing unit 21 to communication control unit 20 is carried out.

Other communication pairs P1, P3 may also include an aspect in which heartbeat processing is carried out from one of the components configuring each of communication pairs P1, P3 to the other component thereof.

Moreover, Embodiment 1 has been described as an aspect in which, if each of soundness determination unit 211a of DSRC processing unit 21 and soundness determination unit 201a of communication control unit 20 determines that the operation of the target components (communication control unit 20 and DSRC processing unit 21) has abnormalities, it outputs a restart instruction signal to the components and executes restart (Step S04 of FIG. 5). However, other embodiments are not limited to this aspect.

For example, other embodiments may include an aspect in which, in a case where soundness determination units 201a, 211a determine that the operation of the target component has abnormalities, a monitoring person, etc. residing in a central facility of toll collection system 1, etc. is notified of the abnormalities.

Specifically, in a case where soundness determination unit 211a of DSRC processing unit 21 determines that communication control unit 20 is not operating normally, soundness determination unit 211a outputs an abnormality signal for notifying that this communication control unit 20 is not operating normally. In addition, in a case where monitoring equipment provided in the abovementioned central facility has accepted the input of the abnormality signal, a monitoring person is notified that abnormalities have occurred in the operation of communication control unit 20, for example, via a monitor.

Thereby, a monitoring person can quickly and accurately recognize that abnormalities have occurred. Therefore, in a case where abnormalities are detected in communication control unit 20, the monitoring person receiving the notification can carry out recovery processing of communication control unit 20 based on his/her determination and thereby more accurately recover the abnormalities in toll collection system 1.

Note that in the abovementioned aspect, it is contemplated that even in a case where the component on the downstream side can detect abnormalities in the components on the upstream side, because the component located on the upstream side, which is located between the component on the downstream side and a central facility (in which a monitoring person waits), has abnormalities, a central facility further upstream cannot be notified of abnormalities. Therefore, toll collection system 1 may have a communication line for directly transmitting the abovementioned notification to the central facility if the component on the downstream side has detected abnormalities in the component on the upstream side.

Embodiment 2

Subsequently, a toll collection system according to Embodiment 2 will be described in detail with reference to FIGS. 7 to 11.

Functional Elements of the Toll Collection System

Figure 7:
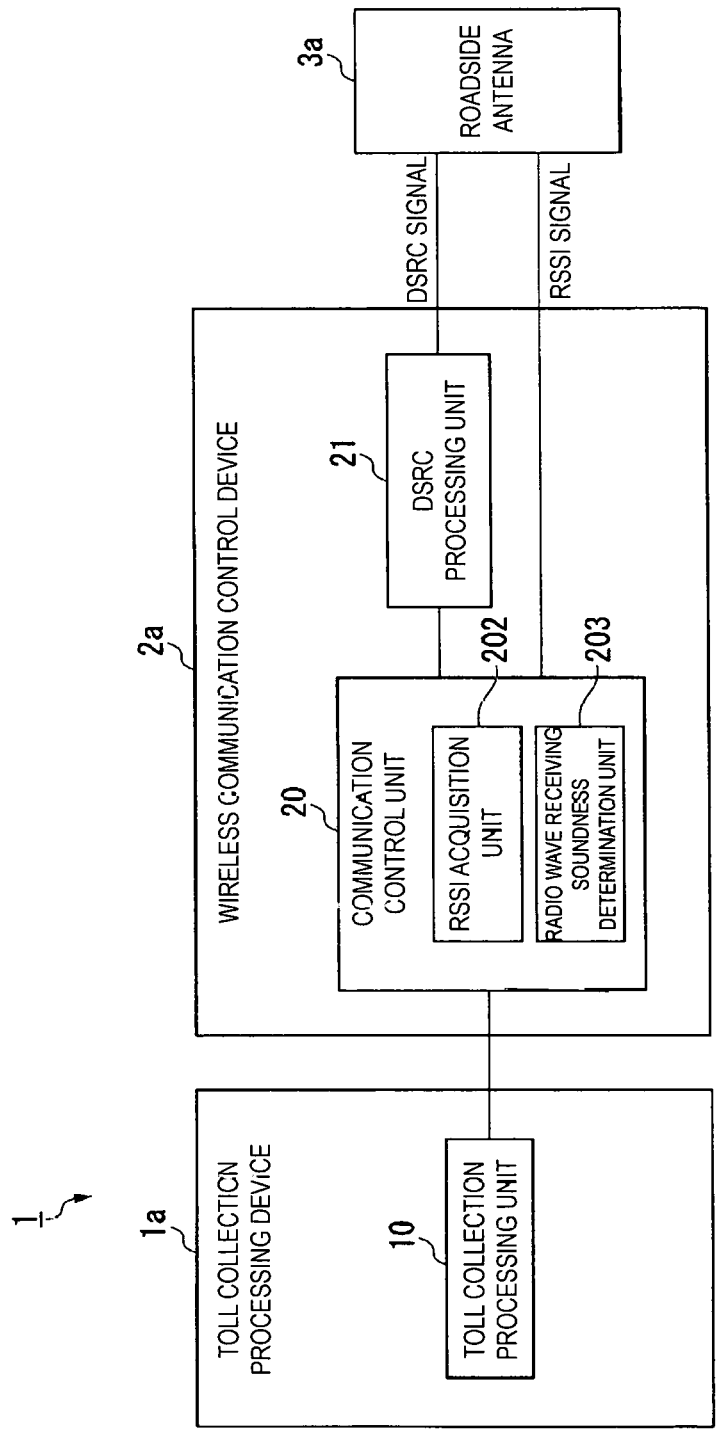
FIG. 7 is a diagram illustrating the functional elements of a toll collection system according to Embodiment 2.

FIG. 7 is a diagram illustrating the functional elements of the toll collection system according to Embodiment 2.

In FIG. 7, the same components as those in Embodiment 1 will be denoted by the same reference symbols, with descriptions thereof omitted.

As illustrated in FIG. 7, toll collection system 1 according to Embodiment 2, as in Embodiment 1, includes toll collection processing device 1a, wireless communication control device 2a, and roadside antenna 3a. Note that toll collection system 1 according to the present embodiment, as in Embodiment 1, further includes wireless communication control device 2b and roadside antenna 3b (refer to FIG. 2), with the illustration of the configuration thereof omitted.

Wireless communication control device 2a illustrated in FIG. 7 includes communication control unit 20 along with DSRC processing unit 21.

Moreover, as illustrated in FIG. 7, communication control unit 20 includes RSSI acquisition unit 202 (reception strength acquisition unit) along with radio wave receiving soundness determination unit 203.

RSSI acquisition unit 202 acquires an RSSI signal (reception strength information) indicating the reception strength (RSSI: Received Signal Strength Indication) of radio waves received by this roadside antenna 3a, from roadside antenna 3a.

Radio wave receiving soundness determination unit 203 determines whether roadside antenna 3a is operating normally based on whether the time span, in which reception strength I of radio waves indicated by the RSSI signal is lower than predetermined reception determination threshold Ih (I<Ih), continues for predetermined determination reference time th or longer.

Note that in the present embodiment, while communication control unit 20, DSRC processing unit 21, toll collection processing unit 10, and roadside antenna 3a, as in Embodiment 1 (or a modified example thereof), are described as including heartbeat processing units 201, 202, etc., other embodiments are not limited to this aspect.

That is, other embodiments may include an aspect in which communication control unit 20, DSRC processing unit 21, toll collection processing unit 10, and roadside antenna 3a do not include heartbeat processing units 201, 202, etc.

Functional Elements of the Roadside Antenna

Figure 8:
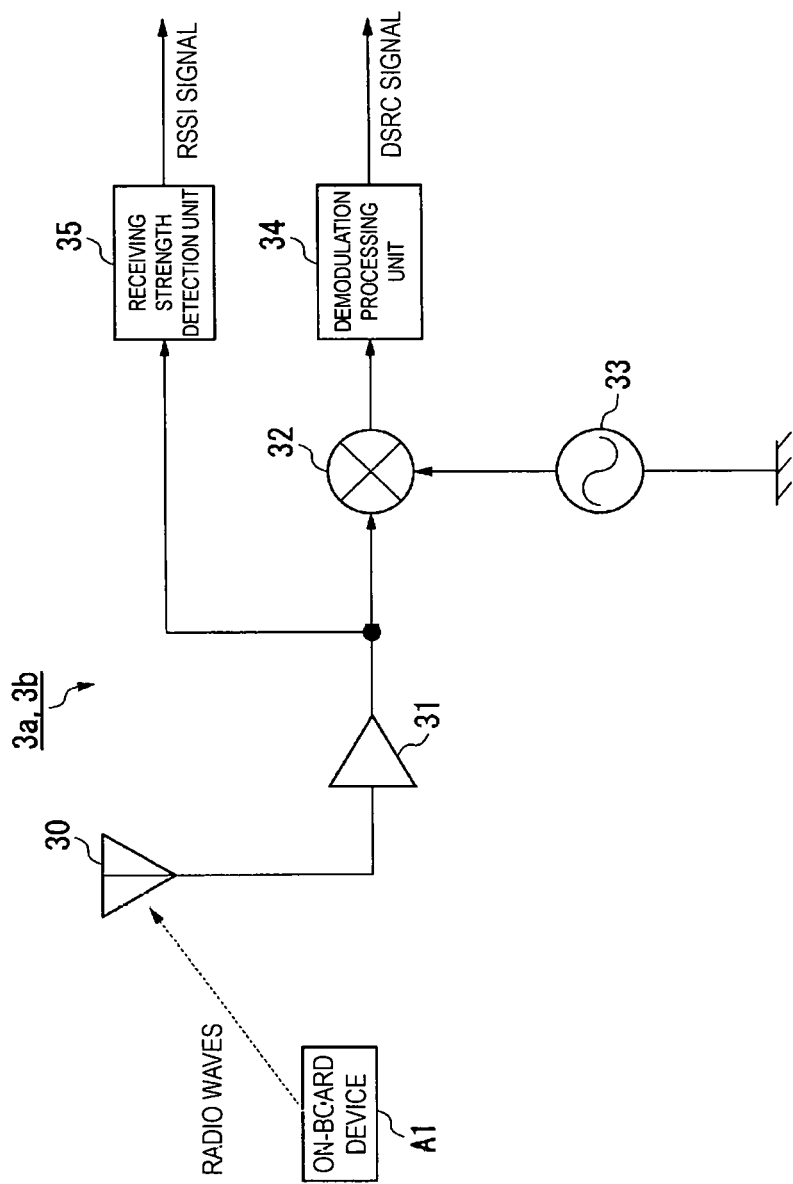
FIG. 8 is a diagram illustrating the functional elements of a roadside antenna according to Embodiment 7.

FIG. 8 is a diagram illustrating the functional elements of a roadside antenna according to Embodiment 2.

As illustrated in FIG. 8, roadside antennas 3a, 3b include antenna element 30, amplifier 31, mixer 32, reference oscillation source 33, demodulation processing unit 34, and reception strength detection unit 35.

Antenna element 30 is an element for receiving radio waves sent from on-board device A1.

Amplifier 31 is, for example, Low Noise Amplifier (LNA), for amplifying and outputting a high frequency signal output from antenna element 30 in accordance with the reception of radio waves.

Mixer 32 mixes, with a reference frequency signal, the high frequency signal output from antenna element 30 and amplified by amplifier 31, and converts them to a low frequency signal.

Reference oscillation source 33 outputs the reference frequency signal which oscillates at a predetermined reference frequency.

Demodulation processing unit 34 carries out demodulation processing on a signal converted to a low frequency and extracts information overlapped by the received radio waves (for example, UW2, LID, etc. described in FIG. 3). Demodulation processing unit 34 outputs extracted information as a DSRC signal to DSRC processing unit 21 (FIG. 7).

Reception strength detection unit 35 is a detection sensor for inputting the high frequency signal output from antenna element 30 and amplified by amplifier 31, in addition to detecting reception strength I. Reception strength detection unit 35 outputs the RSSI signal indicating detected reception strength I.

Processing Flow of the Radio Wave Receiving Soundness Determination Unit

Figure 9:
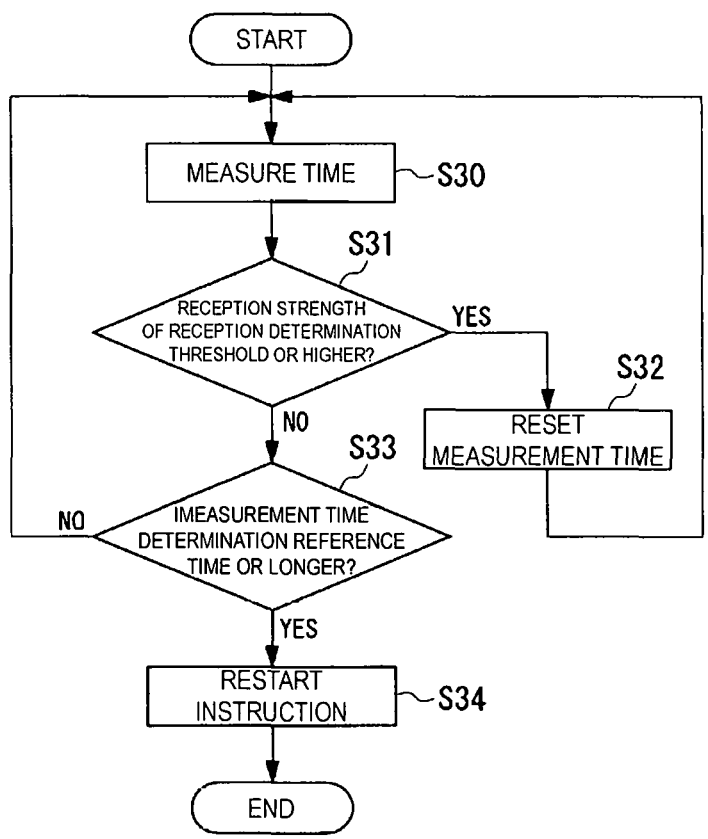
FIG. 9 is a diagram illustrating the processing flow of a radio wave receiving soundness determination unit according to Embodiment 2.

FIG. 9 is a diagram illustrating the processing flow of a radio wave receiving soundness determination unit according to Embodiment 2.

First, while measuring the time after a certain time of day has elapsed (Step S30), radio wave receiving soundness determination unit 203 determines, based on the RSSI signal acquired by RSSI acquisition unit 202, whether reception strength I of predetermined reception determination threshold Ih or higher has been detected (Step S31).

If reception strength I of reception determination threshold Ih or higher has been detected (Step S31: YES), radio wave receiving soundness determination unit 203 resets the time during measurement (Step S32), and restarts measuring the time in Step S30. In contrast, if reception strength I of reception determination threshold Ih or higher has not been detected (Step S31: NO), a determination is made regarding whether time (measurement time t) during measurement in Step S30 is prespecified determination reference time th or longer (Step S33).

If measurement time t is not determination reference time th or longer (Step S33: NO), radio wave receiving soundness determination unit 203 continues measuring the time in Step S30. In contrast, if it has reached determination reference time th (Step S33: YES), radio wave receiving soundness determination unit 203 determines that abnormalities have occurred in roadside antenna 3a and instructs roadside antenna 3a to restart processing (Step S34).

Operational Effects

As described above, toll collection system 1 according to Embodiment 2 includes: RSSI acquisition unit 202 for acquiring the RSSI signal indicating reception strength I of radio waves from on-board device A1 received by roadside antennas 3a, 3b; and radio wave receiving soundness determination unit 203 for determining whether roadside antennas 3a, 3b are operating normally based on whether the time width (measurement time t), in which reception strength I of radio waves indicated in the RSSI signal is lower than predetermined reception determination threshold Ih, continues for predetermined determination reference time th or longer.

Here, in specified communication regions Q1, Q2 of toll collection system 1 (FIG. 1), vehicle A normally drives at a predetermined frequency (the number of passing vehicles per unit time) in accordance with the user number of an expressway (the driving quantity of vehicle A). That is, roadside antennas 3a, 3b receive radio waves from on-board device A1 at a predetermined frequency in accordance with the driving quantity of vehicle A on the expressway and wirelessly communicate. Consequently, in the normal operation of toll collection system 1, the time width, in the state in which roadside antennas 3a, 3b do not receive radio waves from on-board device A1 is allowed to continue, is contemplated from the number of passing vehicles per unit time in specified communication region Q1.

In this case, in a case where the state of not observing the reception of radio waves from on-board device A1 continues for a time clearly longer than the abovementioned contemplated time width, abnormalities by which "although vehicle A actually passes through specified communication regions Q1, Q2, roadside antennas 3a, 3b have not correctly received radio waves from on-board device A1" are dubious.

With that, in accordance with the abovementioned processing flow (Steps S30 to S34), radio wave receiving soundness determination unit 203 determines that the operation of roadside antennas 3a, 3b has abnormalities, in a case where the state, in which reception strength I of radio waves is not predetermined reception determination threshold Ih or higher, continues to determination reference time th set based on the number of passing vehicles per unit time. In addition, radio wave receiving soundness determination unit 203 instructs roadside antennas 3a, 3b to restart processing.

As a result, because abnormalities in the operation of roadside antennas 3a, 3b can be further detected using the reception strength (RSSI) of radio waves, abnormalities in toll collection system 1 can be further accurately detected.

Modified Example of Embodiment 2

Figure 10:
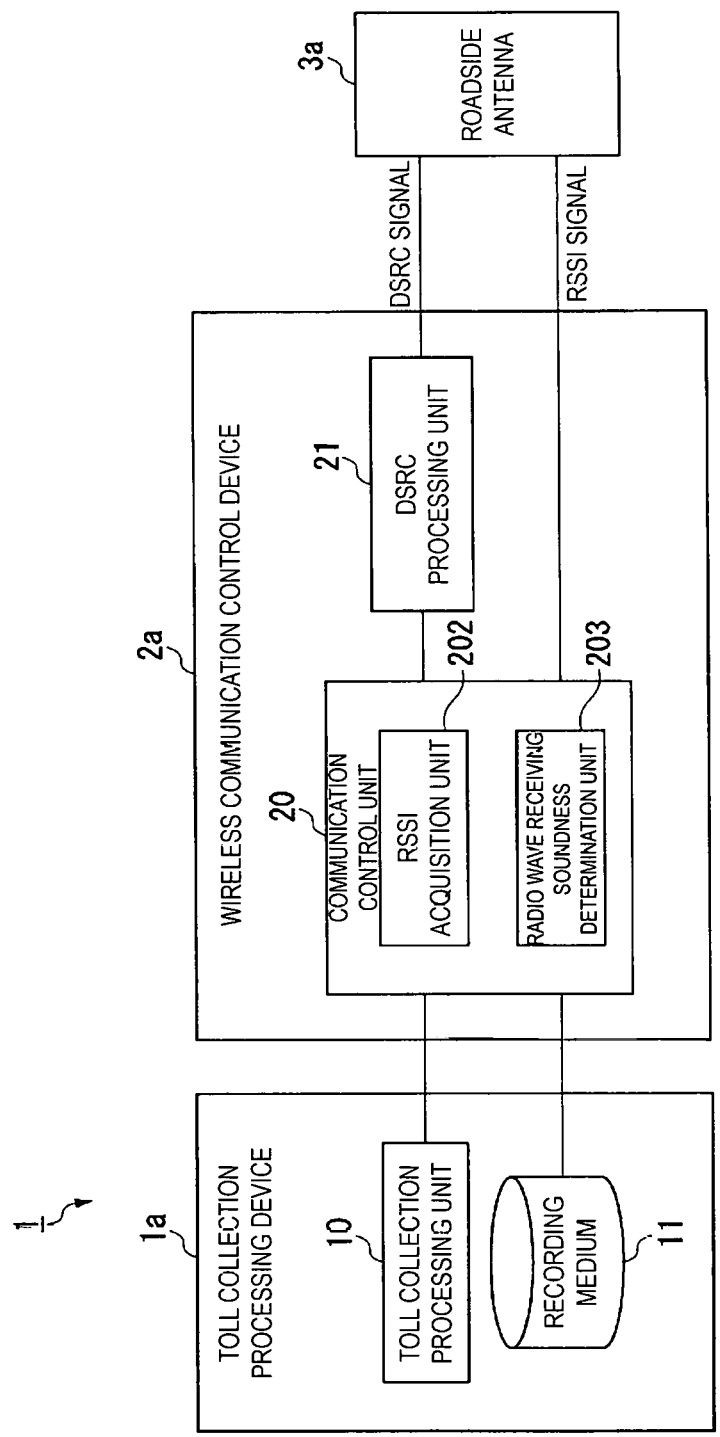
FIG. 10 is a diagram illustrating the functional elements of a toll collection system according to a modified example of Embodiment 2.

FIG. 10 is a diagram illustrating the functional elements of a toll collection system according to a modified example of Embodiment 2.

As illustrated in FIG. 10, toll collection processing device 1a of toll collection system 1 according to the present modified example includes recording medium 11 with pre-acquired statistical data D (mentioned below) recorded therein.

Moreover, radio wave receiving soundness determination unit 203 according to the present modified example further changes determination reference time th for each time span based on statistical data D indicating the driving quantity of vehicle A.

Figure 11:
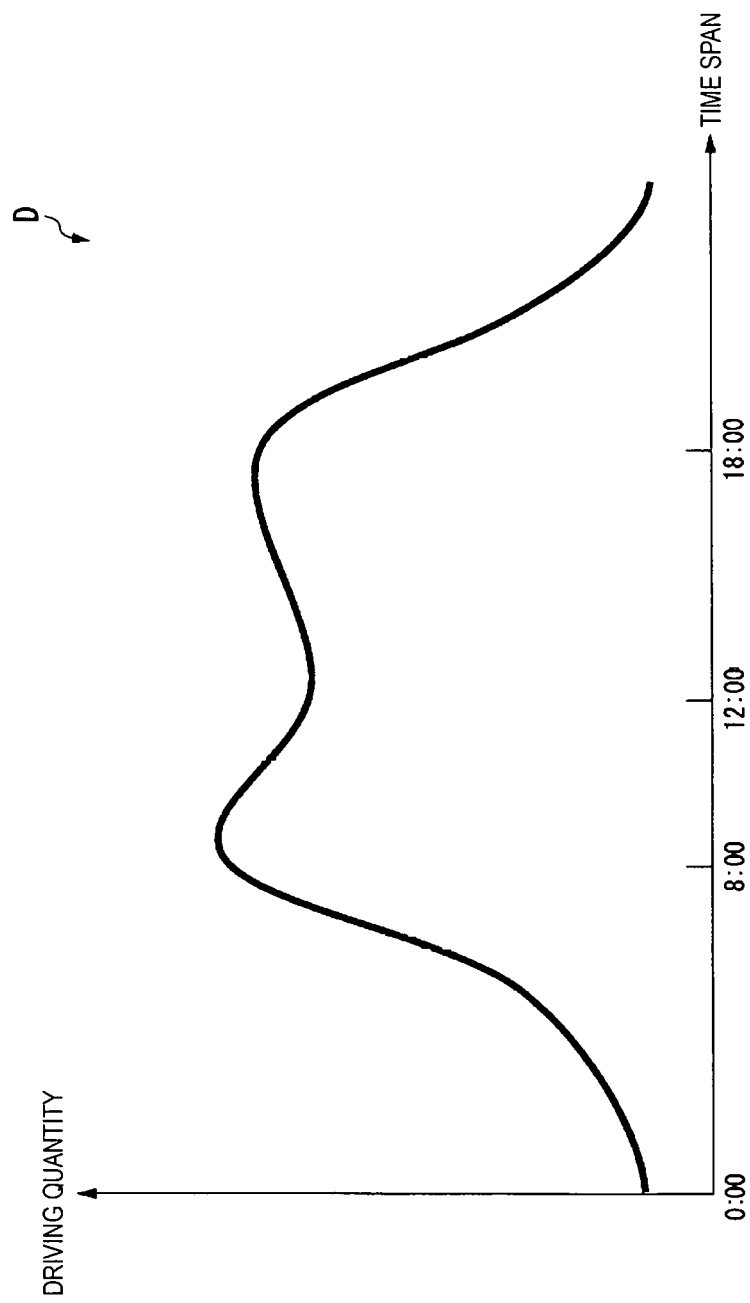
FIG. 11 is a diagram explaining the statistical data recorded in a recording medium according to a modified example of Embodiment 2.

FIG. 11 is a diagram explaining the statistical data recorded in a recording medium according to a modified example of Embodiment 2.

Toll collection processing unit 10 according to the present modified example sequentially records and accumulates information on toll collection processing (vehicle type information, license plate information, charging amount, year, month, day, and time of day, etc.) for each user of an expressway. In addition, toll collection processing unit 10 creates statistical data D indicating the user number at each time span of one day (that is, the driving quantity of vehicle A) based on this accumulated information about toll collection processing (particularly the year, month, day, and time of day).

Here, in accordance with the example of statistical data D illustrated in FIG. 11, in toll collection system 1 according to the present modified example, the driving quantity of vehicle A increases from early morning (about 8 o'clock) to evening (about 18 o'clock), while the driving quantity of vehicle A at midnight (about 0 o'clock) tends to decrease.

Based on this statistical data D, for example, radio wave receiving soundness determination unit 203 according to the present modified example carries out processing so as to set determination reference time th to be relatively short, for the time span in which the driving quantity of vehicle A is large, and in contrast, set determination reference time th to be relatively long, for the midnight time span in which the driving quantity of vehicle A is small.

As a result, in a case where the number of passing vehicles per unit time changes in accordance with the time span, radio wave receiving soundness determination unit 203 can apply determination reference time th suitable for the number of passing vehicles for each time span and determine the soundness of roadside antennas 3a, 3b.

Note that while the abovementioned modified example has been described as an aspect in which toll collection processing unit 10 creates statistical data D based on information with regard to accumulated toll collection processing, still other modified examples are not limited to this aspect. For example, simply by measuring reception strength (RSSI) of radio waves for each time span, toll collection processing unit 10 may create statistical data D indicating a user number for each time span of one day.

Note that while radio wave receiving soundness determination unit 203 according to a modified example of Embodiment 2 has been described as referring to statistical data D indicating the driving quantity of vehicle A for each time span of one day (early morning, evening, midnight, etc.) and changing determination reference time th for each time span of one day, other embodiments are not limited to this aspect.

For example, radio wave receiving soundness determination unit 203 according to another embodiment may refer to statistical data D indicating the driving quantity of vehicle A for each time span of one month (beginning of month, end of month, etc.) or one year (beginning of year, end of year, each season, etc.) and change determination reference time th for each time span of this one month or one year.

Moreover, Embodiment 2 has been described in which, if radio wave receiving soundness determination unit 203 determines that abnormalities have occurred in roadside antennas 3a, 3b, it instructs roadside antennas 3a, 3b to restart processing (Step S34 of FIG. 9). However, other embodiments are not limited to this aspect.

For example, other embodiments may include an aspect in which, in a case where radio wave receiving soundness determination unit 203 determines that the operation of the target components (roadside antennas 3a, 3b) has abnormalities, the monitoring person, etc. residing in a central facility of toll collection system 1, etc. is notified of the abnormalities.

Embodiment 3

Subsequently, a toll collection system according to Embodiment 3 will be described in detail with reference to FIGS. 12 to 13.

Functional Elements of the Toll Collection System

Figure 12:
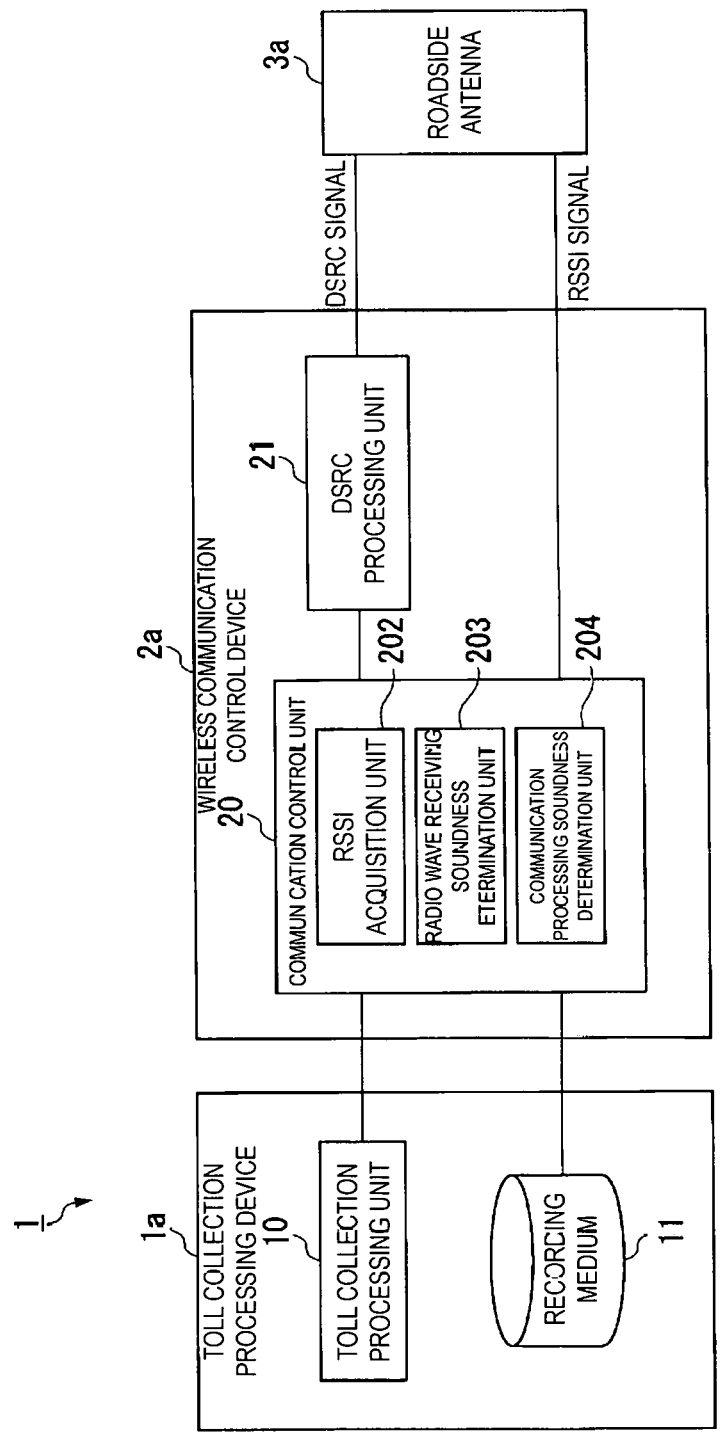
FIG. 12 is a diagram illustrating the functional elements of a toll collection system according to Embodiment 3.

FIG. 12 is a diagram illustrating the functional elements of a toll collection system according to Embodiment 3.

In FIG. 12, the same components as those in Embodiments 1 and 2 and various modified examples will be denoted by the same reference symbols, with descriptions thereof omitted.

As illustrated in FIG. 12, toll collection system 1 according to Embodiment 3, as in Embodiments 1 and 2, includes toll collection processing device 1a, wireless communication control device 2a, and roadside antenna 3a. Note that toll collection system 1 according to the present embodiment, as in Embodiments 1 and 2, further includes wireless communication control device 2b and roadside antenna 3b (refer to FIG. 2), with the illustration of the configuration thereof omitted.

Moreover, communication control unit 20 of toll collection system 1 according to Embodiment 3 further includes communication processing soundness determination unit 204.

In a case where reception strength I of radio waves indicated in the RSSI signal is reception determination threshold Ih or higher and the results of the dedicated short-range communication processing have not been correctly acquired from DSRC processing unit 21, communication processing soundness determination unit 204 determines that at least one of roadside antennas 3a, 3b or DSRC processing unit 21 is not operating normally.

Here, the phrase "the results of the dedicated short-range communication processing have not been correctly acquired", for example, means that during the dedicated short-range communication, part of the information not made into reference symbols in radio waves transmitted from the on-board device cannot be correctly decoded, with abnormalities such as CRC errors on the receiver side of radio waves detected.

Figure 13:
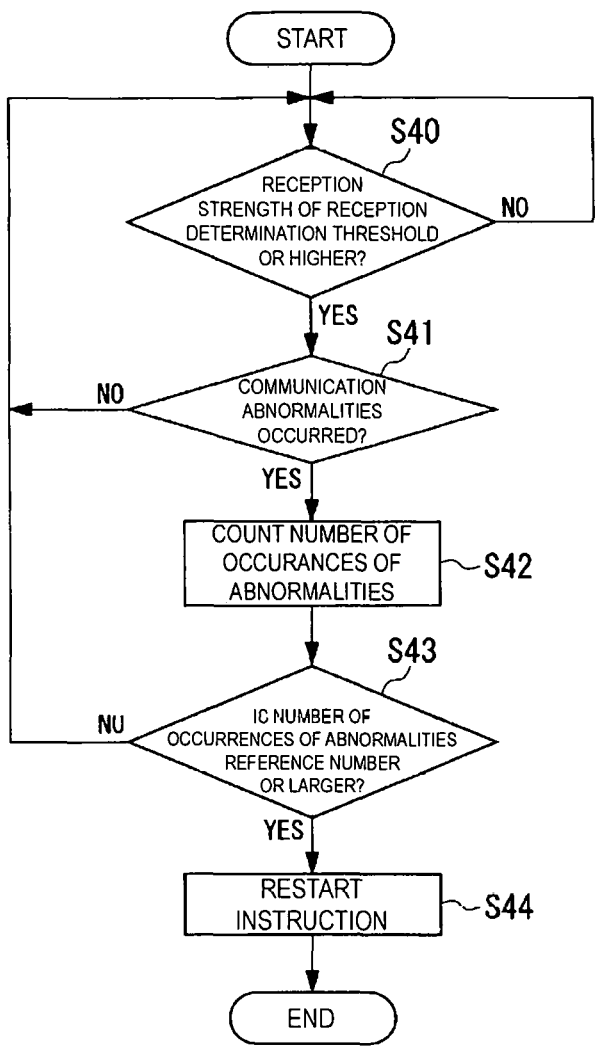
FIG. 13 is a diagram illustrating the processing flow of a communication processing soundness determination unit according to Embodiment 3.

FIG. 13 is a diagram illustrating the processing flow of a communication processing soundness determination unit according to Embodiment 3.

First, communication processing soundness determination unit 204 determines, based on the RSSI signal acquired by RSSI acquisition unit 202, whether reception strength I of reception determination threshold Ih or higher has been detected (Step S40).

While reception strength I of reception determination threshold Ih or higher is not detected (Step S40: NO), processing of Step S40 is repeated and waited.

In contrast, if reception strength I of reception determination threshold Ih or higher has been detected (Step S40: YES), communication processing soundness determination unit 204 acquires the results of the dedicated short-range communication processing carried out by DSRC processing unit 21 with on-board device A1 and determines whether abnormalities occur in the results of this dedicated short-range communication processing (Step S41).

If no abnormalities have occurred in the results of the dedicated short-range communication processing by DSRC processing unit 21 (Step S41: NO), communication processing soundness determination unit 204 returns to Step S40 and again waits for the detection of reception strength I of reception determination threshold Ih or higher. Here, communication processing soundness determination unit 204, for example, refers to CRC (FIG. 3) contained in the ACTC signal, etc. as the results of the dedicated short-range communication processing by DSRC processing unit 21 and determines whether it is a telegraphic message in accordance with the ARIB specifications.

In contrast, if abnormalities have occurred in the results of the dedicated short-range communication processing by DSRC processing unit 21 (Step S41: YES), communication processing soundness determination unit 204 counts the number of occurrences of abnormalities in the results of this dedicated short-range communication processing (Step S42). In addition, communication processing soundness determination unit 204 determines whether the abovementioned number of occurrences of abnormalities is a predetermined reference number (for example, 10 times) or more (Step S43).

Here, if the number of occurrences of abnormalities is not a predetermined reference number or higher (Step S43: NO), communication processing soundness determination unit 204 returns to Step S40 and again waits for the detection of reception strength I of reception determination threshold Ih or higher. In contrast, if the number of occurrences of abnormalities is a predetermined reference number or higher (Step S43: YES), communication processing soundness determination unit 204 determines that abnormalities have occurred in at least one of DSRC processing unit 21 or roadside antenna 3a and instructs DSRC processing unit 21 and roadside antenna 3a to restart processing (Step S44).

Operational Effects

As described above, toll collection system 1 according to Embodiment 3 further includes communication processing soundness determination unit 204, wherein, if reception strength I of radio waves indicated in the RSSI signal is reception determination threshold Ih or higher (Step S40: YES) and the results of the dedicated short-range communication processing have not been correctly acquired from DSRC processing unit 21 (Step S41: YES), communication processing soundness determination unit 204 determines that at least one of roadside antennas 3a, 3b or DSRC processing unit 21 is not operating normally.

Here, in a case where reception strength I of radio waves received from on-board device A1 is lower than reception determination threshold Ih, because reception strength I is insufficient, for example, demodulation processing, etc. in demodulation processing unit 34 (FIG. 8) of roadside antennas 3a, 3b may not be correctly executed (for example, in received radio waves, a reference symbol, which was originally"1", may be mistakenly demodulated to "0"). Therefore, it is contemplated that even in a case where DSRC processing unit 21 is operating normally, the results of the dedicated short-range communication processing cannot be correctly acquired.

However, the event (wherein, even through reception strength I of radio waves received from on-board device A1 is sufficient, the results of the dedicated short-range communication processing cannot be correctly acquired from DSRC processing unit 21 (CRC abnormalities has occurred)) has occurred multiple times, abnormalities have likely occurred in at least one of DSRC processing unit 21 or roadside antenna 3a (demodulation processing unit 34).

With this, if the number (wherein, even though reception strength I of radio waves is reception determination threshold Ih or higher, the results of the dedicated short-range communication processing have not been correctly acquired from DSRC processing unit 21) is a predetermined reference number or higher, communication processing soundness determination unit 204 determines, in accordance with the abovementioned processing flow (Step S40 to S44), that at least one of DSRC processing unit 21 or roadside antenna 3a is not operating normally. Subsequently, communication processing soundness determination unit 204 instructs DSRC processing unit 21 and roadside antenna 3a to restart processing.

As a result, because abnormalities in the operation of roadside antennas 3a, 3b or DSRC processing unit 21 can be further detected using the combination of reception strength (RSSI) of radio waves and the results of the dedicated short-range communication processing of DSRC processing unit 21, abnormalities in toll collection system 1 can be further accurately detected.

Note that Embodiment 3 has been described in which, if communication processing soundness determination unit 204 determines that abnormalities have occurred in at least one of roadside antennas 3a, 3b or DSRC processing unit 21, it instructs roadside antennas 3a, 3b and DSRC processing unit 21 to restart processing (Step S44 of FIG. 13). However, other embodiments are not limited to this aspect.

For example, other embodiments may include an aspect in which, in a case where communication processing soundness determination unit 204 determines that the operation of the target components (roadside antennas 3a, 3b and DSRC processing unit 21) has abnormalities, a monitoring person, etc. residing in a central facility of toll collection system 1, etc. is notified of the abnormalities.

Moreover, Embodiment 3 describes that, assuming that abnormalities have not occurred in on-board device A1 itself for sending radio waves, in a case where the results of the dedicated short-range communication processing have not been correctly acquired from DSRC processing unit 21 (CRC abnormalities of reference number or higher have been detected), a determination is made that any one of DSRC processing unit 21 or roadside antenna 3a is not operating normally.

However, it is contemplated that in a case where on-board device A1 itself serving as the sender of radio waves has abnormalities, radio waves originally having CRC abnormalities have been sent. In this case, despite abnormalities on the on-board device A1 side, a determination may actually be mistakenly made that DSRC processing unit 21 or roadside antenna 3a has abnormalities.

With this, communication processing soundness determination unit 204 according to a modified example of Embodiment 3 reads the LID of on-board device A1 from the ACTC signal in which CRC abnormalities have been detected despite reception strength I being reception determination threshold Ih or higher and counts the varieties thereof. In addition, in a case where the variety of this LID is a predetermined reference number or higher, communication processing soundness determination unit 204 may determine that at least one of DSRC processing unit 21 or roadside antenna 3a is not operating normally. That is, because it is hard to contemplate that radio waves of CRC abnormalities are sent from multiple on-board devices A1, the occurrence locations of the abnormalities can be narrowed down to antenna 3a or DSRC processing unit 21.

Embodiment 4

Subsequently, a toll collection system according to Embodiment 4 will be described in detail with reference to FIG. 14.

Functional Elements of the Toll Collection System

Figure 14:
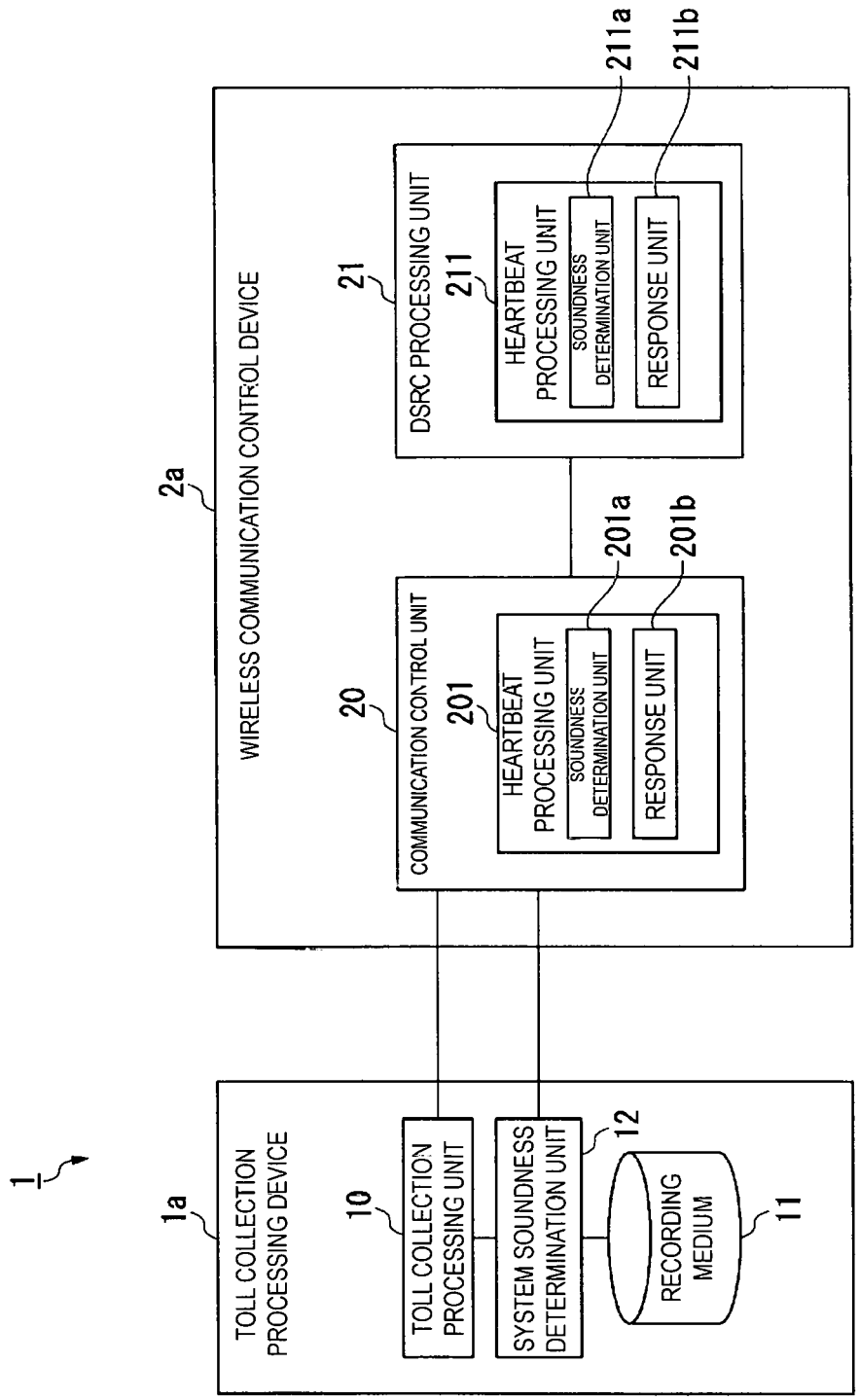
FIG. 14 is a diagram illustrating the functional elements of a toll collection system according to Embodiment 4.

FIG. 14 is a diagram illustrating the functional elements of a toll collection system according to Embodiment 4.

In FIG. 14, the same components as those in Embodiments 1 to 3 and various modified examples will be denoted by the same reference symbols, with descriptions thereof omitted.

As illustrated in FIG. 14, toll collection system 1 according to Embodiment 4, as in Embodiments 1 and 3, includes toll collection processing device 1a along with wireless communication control device 2a. Note that toll collection system 1 according to the present embodiment, as in Embodiments 1 to 3, further includes wireless communication control device 2b and roadside antennas 3a, 3b (refer to FIG. 2), with the illustration of the configuration thereof omitted.

Moreover, toll collection processing device 1a includes toll collection processing unit 10, recording medium 11, and system soundness determination unit 12.

In a case where number r of toll collection processing executed per unit time is lower than predetermined reference processing number rh, system soundness determination unit 12 determines that at least one of various devices (roadside antennas 3a, 3b, DSRC processing unit 21, communication control unit 20, and toll collection processing unit 10) configuring toll collection system 1 is not operating normally.

More specifically, system soundness determination unit 12 refers to statistical data D (FIG. 11) recorded in recording medium 11 and determines that at least one of various devices (toll collection processing device 1a, wireless communication control devices 2a, 2b, and roadside antennas 3a, 3b) configuring toll collection system 1a is not operating normally, in a case where number r of toll collection processing executed per unit time is lower than reference processing number rh in accordance with statistical data D.

For example, in a case where the present time of day is 12:00, system soundness determination unit 12 refers to the driving quantity in this time span of 12:00 from statistical data D and sets reference processing number rh in accordance with the driving quantity. In addition, system soundness determination unit 12 counts number r of toll collection processing executed per unit time in toll collection processing unit 10, and determines whether the number is lower than the abovementioned reference processing number rh (whether r<rh).

Moreover, in a case where number r of toll collection processing executed per unit time is lower than reference processing number rh (r<rh) in accordance with the time span of the present time of day, system soundness determination unit 12 determines that at least one of various devices (toll collection processing device 1a, wireless communication control devices 2a, 2b, and roadside antennas 3a, 3b) has abnormalities and gives instructions to restart the processing of various devices configuring toll collection system 1.

Operational Effects

Here, in specified communication regions Q1, Q2 of toll collection system 1 (FIG. 1), vehicle A normally drives at a predetermined frequency (the number of passing vehicles per unit time) in accordance with the user number of an expressway (the driving quantity of vehicle A). Therefore, it is contemplated that in a case where overall toll collection system 1 functions normally, toll collection processing unit 10 executes toll collection processing at the frequency of predetermined reference processing number rh or higher in accordance with the abovementioned number of passing vehicles.

In this case, in a case where the number r of actual toll collection processing executed per unit time is lower than reference processing number rh, abnormalities by which "although vehicle A actually passes through specified communication regions Q1, Q2, toll collection processing has not been correctly carried out for each vehicle A" ale dubious.

With this, as mentioned above, in a case where the number r in which toll collection processing has been executed per unit time is lower than predetermined reference processing number rh, system soundness determination unit 12 determines that at least one of various devices configuring toll collection system 1 is not operating normally. In addition, system soundness determination unit 12 instructs overall various devices to restart processing.

For example, it is contemplated that in accordance with the aspect of operation abnormalities which may occur in communication control unit 20, only part of each process executed by communication control unit 20 has abnormalities. In this case, it is presumed that although processing (creation of information for toll collection with regard to on-board device A1) which should be originally carried out by communication control unit 20 is not normally carried out, heartbeat processing unit 201 functions normally. In this case, in heartbeat processing unit 211 of DSRC processing unit 21, abnormalities which have occurred in this communication control unit 20 cannot be detected.

In accordance with toll collection system 1 according to the present embodiment, even in such a case, because a determination can be made, based on the number of the actual toll collection processing carried out in toll collection processing unit 10, regarding whether abnormalities occur in any one of various devices configuring toll collection system 1, abnormalities of toll collection system 1 can be more accurately detected.

Note that in toll collection system 1 according to a modified example of Embodiment 4, an aspect of statistical data D may indicate the driving quantity not only for each time span of one day, but also, for example, for each time span of one month or one year.

Moreover, in toll collection system 1 according to another modified example of Embodiment 4, reference processing number rh does not change in accordance with statistical data D, but may be a predetermined constant value.

In the embodiments 1 to 4 described above, various processes are implemented by a program for achieving the various functions of toll collection system 10, communication control unit 20, DSRC processing unit 21, and roadside antennas 3a, 3b. The program is recorded on a computer-readable recording medium and the program recorded on the recording medium is read and executed by a computer system. Additionally, the steps of each process of toll collection system 10, communication control unit 20, DSRC processing unit 21, and roadside antennas 3a, 3b described above are stored in a computer-readable recording medium in the form of a program and these various processes are implemented by the computer reading out and executing this program. Examples of the computer-readable recording medium include magnetic disks, magneto-optical disks, CD-ROMs, DVD-ROMs, and semiconductor memories. This computer program may be distributed to the computer on a communication circuit and the computer receiving this distribution may execute the program.

None of toll collection system 10, communication control unit 20, DSRC processing unit 21, and roadside antennas 3a, 3b are limited to the aspect in which the various functional elements are encased in a single device casing. The various functional elements of each of toll collection system 10, communication control unit 20, DSRC processing unit 21, and roadside antennas 3a, 3b may be distributed in a plurality of network-connected devices.

Embodiment 5

Subsequently, a toll collection system according to Embodiment 5 will be described in detail with reference to FIGS. 15 to 22.

Overall Configuration of the Toll Collection System

Figure 15:
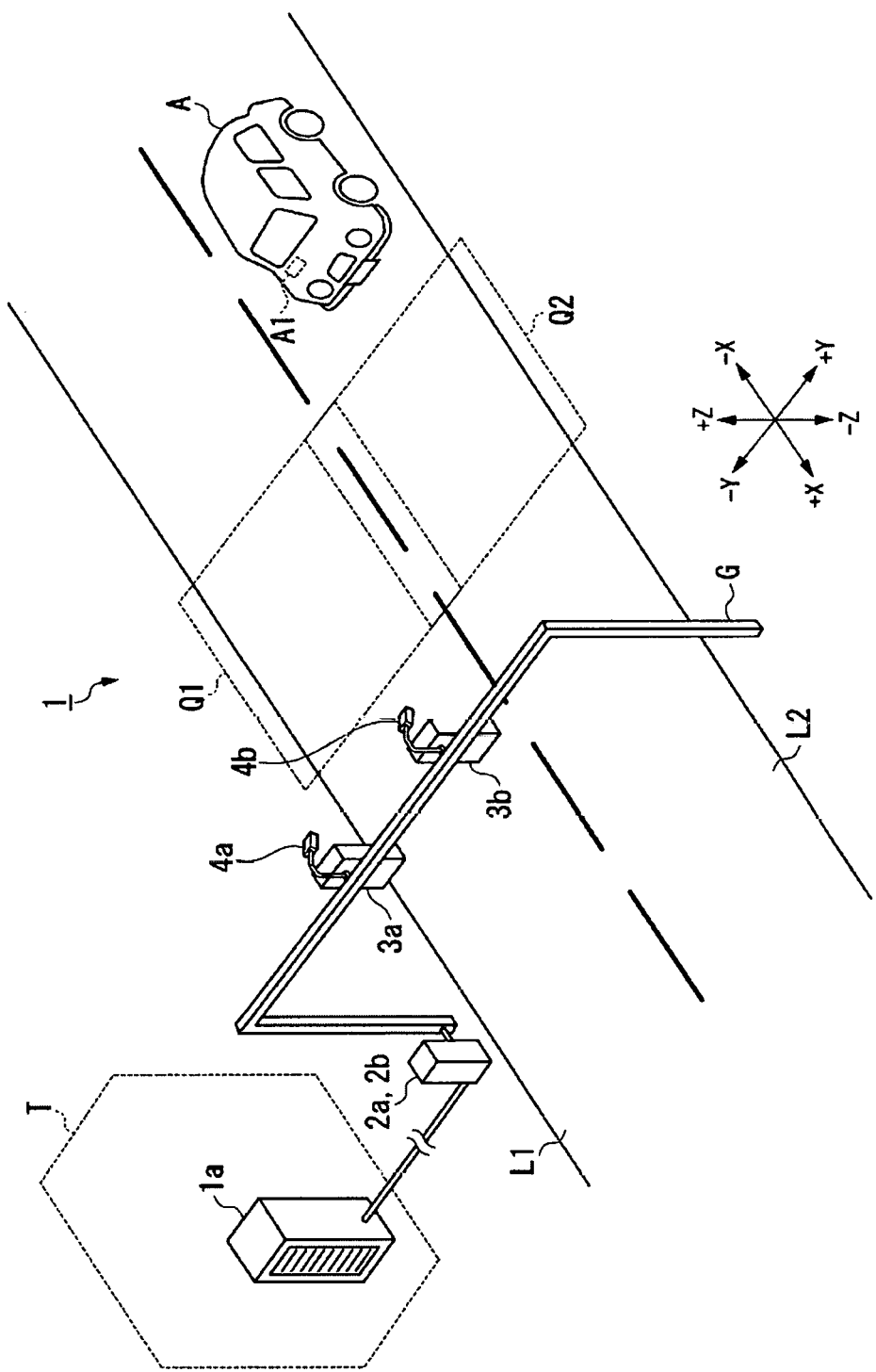
FIG. 15 is a diagram illustrating the overall configuration of a toll collection system according to Embodiment 5.

FIG. 15 is a diagram illustrating the overall configuration of a toll collection system according to Embodiment 5.

As illustrated in FIG. 15, toll collection system 1 includes toll collection processing device 1a, wireless communication control devices 2a, 2b, roadside antennas 3a, 3b, and confirmation apparatuses 4a, 4b. In the present embodiment, toll collection processing device 1a, wireless communication control devices 2a, 2b, and roadside antennas 3a, 3b are the same as in Embodiments 1 to 4.

Moreover, in the present embodiment, as illustrated in FIG. 15, confirmation apparatuses 4a, 4b are respectively attached to roadside antennas 3a, 3b.

Functional Elements of the Toll Collection System

Figure 16:
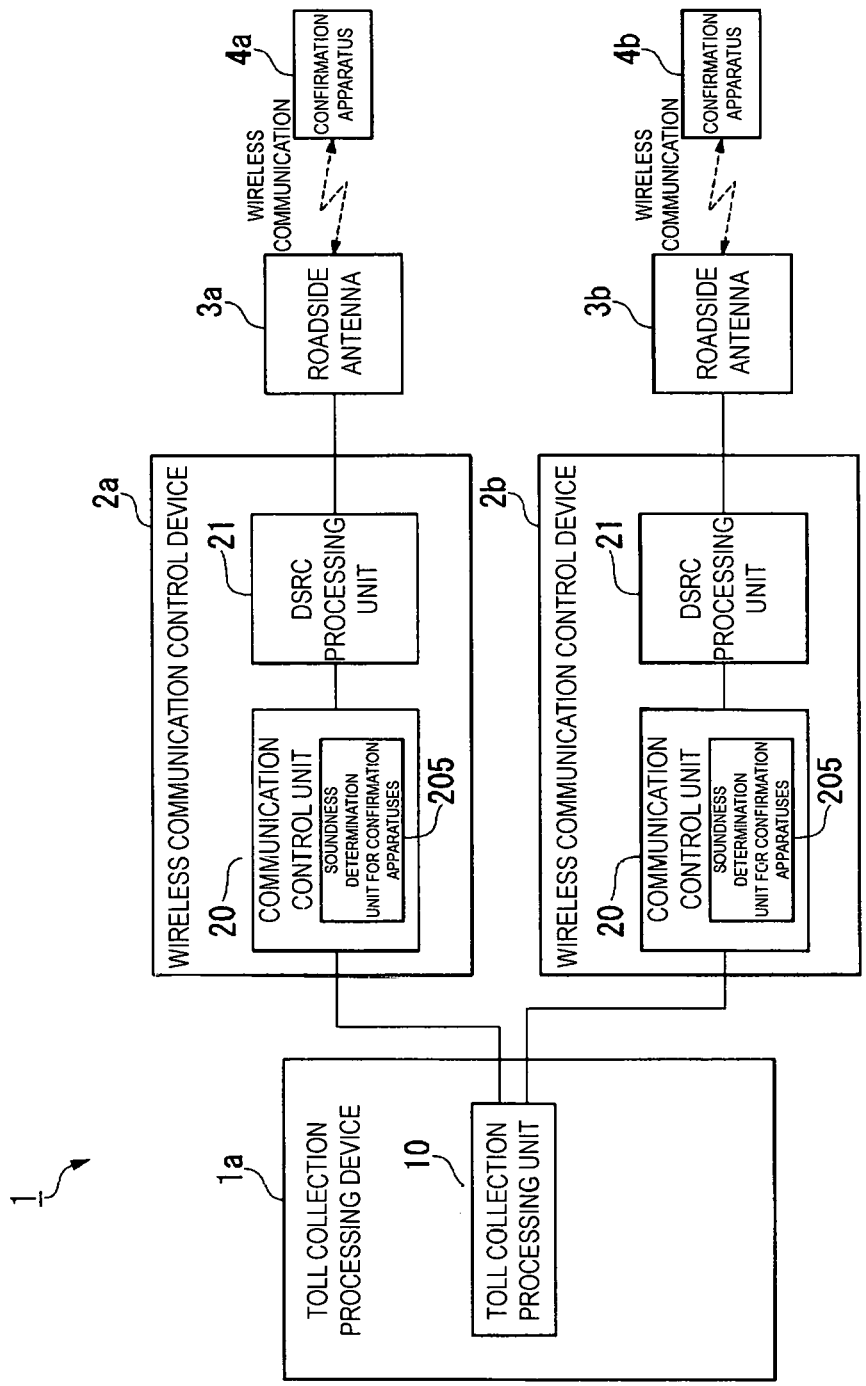
FIG. 16 is a diagram illustrating the functional elements of the toll collection system according to Embodiment 5.

FIG. 16 is a diagram illustrating the functional elements of the toll collection system according to Embodiment 5.

As illustrated in FIG. 16, toll collection processing device 1a includes toll collection processing unit 10. Moreover, each of wireless communication control devices 2a, 2b includes communication control unit 20 along with DSRC processing unit 21 (communication processing unit).

As illustrated in FIG. 16, toll collection processing device 1a of toll collection system 1 includes toll collection processing unit 10. Moreover, each of wireless communication control devices 2a, 2b includes communication control unit 20 along with DSRC processing unit 21 (communication processing unit).

Confirmation apparatuses 4a, 4b are disposed within a range in which wireless communication with each of roadside antennas 3a, 3b is possible, receive confirmation signals (FCMC signals) from each of roadside antennas 3a, 3b, and transmit response signals (ACTC signals).

Communication control unit 20 according to the present embodiment includes soundness determination unit 205 as a confirmation apparatus. Soundness determination unit 205 as a confirmation apparatus determines whether roadside antennas 3a, 3b and wireless communication control devices 2a, 2b are operating normally based on the reception results of the response signal (ACTC signal) from confirmation apparatuses 4a, 4b via roadside antennas 3a, 3b.

Note that toll collection processing unit 10, communication control unit 20, DSRC processing unit 21, and roadside antennas 3a, 3b according to Embodiment 5 are described as including heartbeat processing units (heartbeat processing units 101, 201, 211, etc.) described in Embodiment 1 and a modified example thereof. Moreover, communication control unit 20 according to Embodiment 5 is described as not including radio wave receiving soundness determination unit 203 and communication processing soundness determination unit 204 described in Embodiment 2 and a modified example thereof, as well as Embodiment 3.

However, other embodiments may include an aspect in which toll collection system 1 includes one or more of heartbeat processing units 101, 201, 211, radio wave receiving soundness determination unit 203, or communication processing soundness determination unit 204, wherein soundness determination unit for confirmation apparatuses 205 according to Embodiment 5 determines the soundness of the operation of overall toll collection system 1 in combination with these various functional elements.

Structure of the Roadside Antenna and the Confirmation Apparatus

Figure 17:
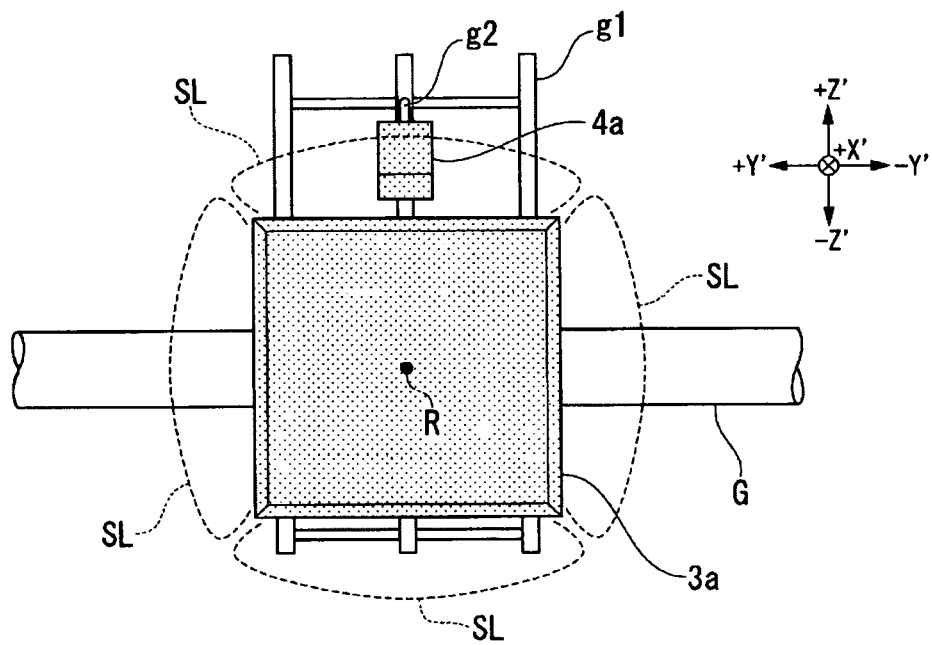
FIG. 17 is a first diagram illustrating the structure of a roadside antenna and a confirmation apparatus according to Embodiment 5.

FIG. 17 is a first diagram illustrating the structure of a roadside antenna and a confirmation apparatus according to Embodiment 5.

Figure 18:
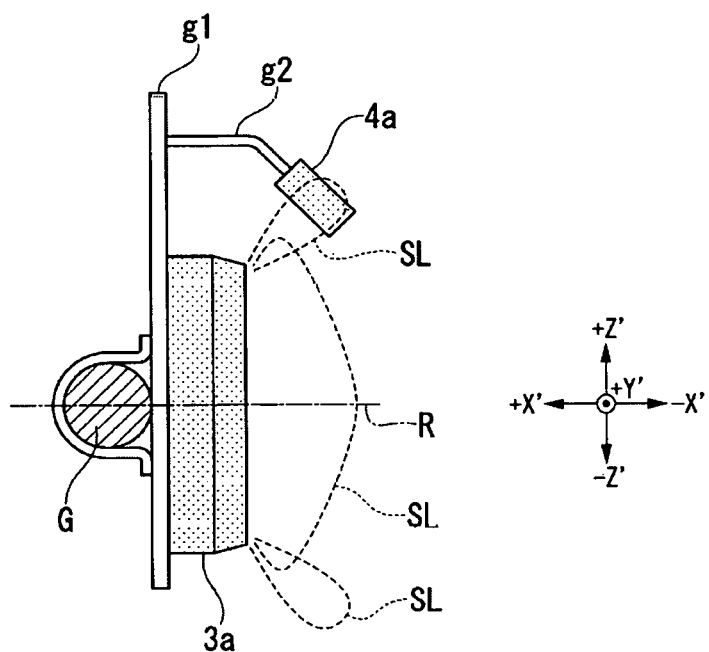
FIG. 18 is a second diagram illustrating the structure of the roadside antenna and the confirmation apparatus according to Embodiment 5.

Moreover, FIG. 18 is a second diagram illustrating the structure of the roadside antenna and the confirmation apparatus according to Embodiment 5.

Here, FIG. 17 illustrates the state in which roadside antenna 3a is seen from the front face thereof, while FIG. 18 illustrates the state in which roadside antenna 3a is seen from the side face thereof.

Note that the ±Y' direction in FIGS. 17 and 18 is the direction parallel to the plate surface of roadside antenna 3a formed in a rectangular plate shape and also parallel to the road surface of lane L1 (refer to FIG. 15). Moreover, the +Z' direction is the direction parallel to the plate surface of roadside antenna 3a and also the direction towards the upper side of roadside antenna 3a (direction distant from the road surface of lane L1 (refer to FIG. 15)). Moreover, the –X' direction in FIGS. 17 and 18 is the direction perpendicular to the plate surface of roadside antenna 3a and also the direction towards specified communication region Q1 (refer to FIG. 15) on the road surface of lane L1.

As illustrated in FIGS. 17 and 18, roadside antenna 3a and confirmation apparatus 4a are fixed and installed to gantry G via attachment jig g1.

Roadside antenna 3a has a main lobe (the range in which the radiation amount of radio waves in the target direction is the highest of the radiation patterns of the antenna) (not illustrated in FIGS. 17 and 18) in accordance with specified communication region Q1 (FIG. 15) on the road surface of lane L1. Here, the main lobe of roadside antenna 3a, for example, is a predetermined range on the front side (Y'Z' plane) on the plate surface (direction (−X' direction) side towards specified communication region Q1), with central axis line R of this plate surface serving as the center.

Moreover, roadside antenna 3a includes side lobe SL having a radiation pattern of unnecessary radio waves occurring in a different direction from the main lobe. For example, as illustrated in FIGS. 17 and 18, with the vicinity of each edge (side) on a rectangular plate surface of roadside antenna 3a serving as the base end, the side lobe SL of roadside antenna 3a extends on the front side thereof (−X' direction side) and in a direction moving away from the central axis line R on this plate surface.

Confirmation apparatus 4a is disposed at a position capable of receiving radio waves of side lobe SL of roadside antenna 3a. Specifically, confirmation apparatus 4a is attached to the tip of fixing rod g2, which is on the upper side (+Z' direction side) on the plate surface of roadside antenna 3a and extends from the back side thereof (+X' direction side) to the front side thereof (−X' direction side). Consequently, confirmation apparatus 4a is disposed on the upper side (+Z' direction side) and the front side (−X' direction side) on the plate surface of roadside antenna 3a.

Note that in FIGS. 17 and 18, the structure and positional relationship of roadside antenna 3a and confirmation apparatus 4a have been described, with the structure and positional relationship of roadside antenna 3b and confirmation apparatus 4b being the same as these.

Functions of Confirmation Apparatus

Figure 19:
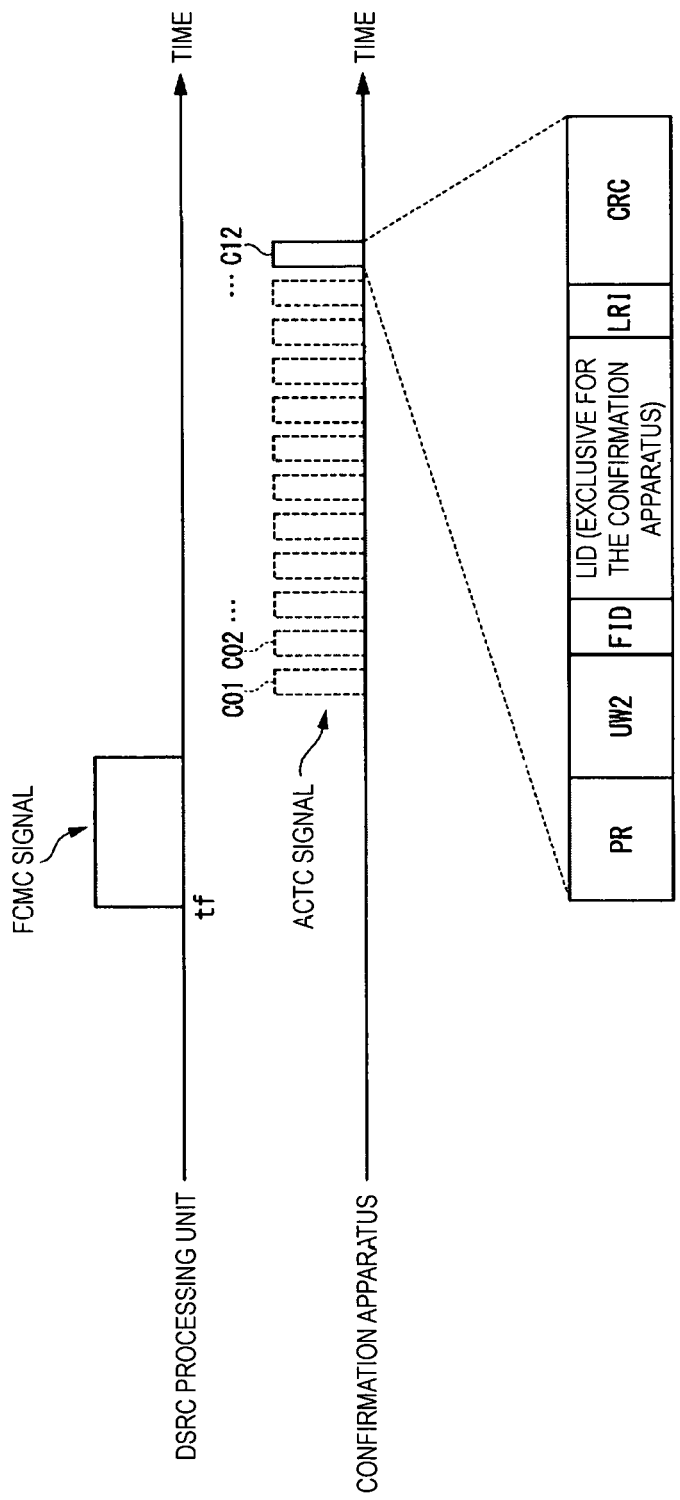
FIG. 19 is a diagram explaining the functions of the confirmation apparatus according to Embodiment 5.

FIG. 19 is a diagram explaining the functions of the confirmation apparatus according to Embodiment 5.

FIG. 19 illustrates the contents of communication processing carried out between DSRC processing unit 21 of wireless communication control device 2a and confirmation apparatus 4a.

As the normal processing, in order to set vehicle A (on-board device A1) located in specified communication region Q1 to the communication target, DSRC processing unit 21 transmits the FCMC signal from certain time of day tf. Here, the FCMC signal is a predetermined request signal transmitted by wireless communication control devices 2a, 2b to on-board device A1 via roadside antennas 3a, 3b in the dedicated short-range communication processing based on the abovementioned ARIB standard specifications. Wireless communication control devices 2a, 2b transmit an FCMC signal (request signal) and request the return of the ACTC signal from on-board device A1.

In a case where on-board device A1 is present in specified communication region Q1, radio waves overlapped by this FCMC signal are received by this on-board device A1 via the main lobe of roadside antenna 3a. In addition, this on-board device A1 returns an ACTC signal serving as a response signal to this FCMC signal.

In contrast, radio waves overlapped by the FCMC signal are radiated to side lobe SL of roadside antenna 3a. Consequently, confirmation apparatus 4a disposed in the positional relationship illustrated in FIGS. 17 and 18 receives the FCMC signal via side lobe SL of roadside antenna 3a.

Confirmation apparatus 4a which receives the FCMC signal transmits the ACTC signal, as a response signal to this FCMC signal, through radio waves, at the timing of any one of 12 channels C01 to C12. In addition, confirmation apparatus 4a assigns an identifier (which is the LID exclusive to the confirmation apparatus allocated inherently in confirmation apparatus 4a and can identify that the transmission source of this ACTC signal is this confirmation apparatus 4a) to the ACTC signal to be transmitted here.

Processing Flow of the Soundness Determination Unit for Confirmation Apparatuses FIG. 5 is a diagram explaining the processing flow of a soundness determination unit for confirmation apparatuses according to Embodiment 5.

First, soundness determination unit for confirmation apparatuses 205 of wireless communication control device 2a detects the transmission of the FCMC signal serving as the confirmation signal from DSRC processing unit 21 (Step S50). At this time, the FCMC signal transmitted from DSRC processing unit 21 is transmitted to confirmation apparatus 4a via side lobe SL of roadside antenna 3a (FIGS. 17 and 18).

Here, in accordance with the reception of the FCMC signal, confirmation apparatus 4a transmits an ACTC signal (refer to FIG. 19) with the LID (LID exclusive to the confirmation apparatus) inherent in confirmation apparatus 4a assigned thereto. Soundness determination unit for confirmation apparatuses 205 refers to the LID assigned to the ACTC signal received via DSRC processing unit 21 and determines whether it has been received from confirmation apparatus 4a (Step S51).

If a response signal (ACTC signal) to the FCMC signal has been received from confirmation apparatus 4a (Step S51: YES), soundness determination unit for confirmation apparatuses 205 returns to Step S50 and again detects the transmission of the FCMC signal.

In contrast, if the ACTC signal has not been received from confirmation apparatus 4a despite the transmission of the FCMC signal from DSRC processing unit 21 (Step S51: NO), soundness determination unit for confirmation apparatuses 205 counts the number (confirmation apparatus nonresponse number) of times a response from confirmation apparatus 4a has not been detected (Step S52). In addition, soundness determination unit for confirmation apparatuses 205 determines whether the abovementioned confirmation apparatus nonresponse number is a predetermined reference number (for example, 10 times) or more (Step S53).

Here, if the confirmation apparatus nonresponse number is not a predetermined reference number or higher (Step S53: NO), soundness determination unit for confirmation apparatuses 205 returns to Step S50 and again detects the transmission of the FCMC signal. In contrast, if confirmation apparatus nonresponse number is a predetermined reference number or higher (Step S53: YES), soundness determination unit for confirmation apparatuses 205 determines that abnormalities have occurred in at least one of DSRC processing unit 21 or roadside antenna 3a and instructs DSRC processing unit 21 and roadside antenna 3a to restart processing (Step S54).

Operational Effects

As described above, toll collection system 1 according to Embodiment 5 is provided with: roadside antennas 3a, 3b that wirelessly communicate with on-board device A1 mounted in vehicle A; wireless communication control devices 2a, 2b that carry out predetermined communication processing (narrow band communication processing) with on-board device A1 via roadside antennas 3a, 3b, and acquire toll collection information with regard to on-board device A1; and confirmation apparatuses 4a, 4b that are disposed within a range in which wireless communication with roadside antennas 3a, 3b is possible, receiving an FCMC signal from the roadside antennas 3a, 3b and transmitting an ACTC signal. Moreover, wireless communication control devices 2a, 2b determine whether roadside antennas 3a, 3b and wireless communication control devices 2a, 2b are operating normally based on the reception results of the ACTC signal from confirmation apparatuses 4a, 4b via roadside antennas 3a, 3b.

That is, every time wireless communication control devices 2a, 2b transmit the FCMC signal towards on-board device A1, confirmation apparatuses 4a, 4b permanently disposed within a communicable range thereof receive this FCMC signal and transmit (return) the response signal (ACTC signal) in accordance with the FCMC signal. Thereby, in accordance with the presence of the reception of the response signal from confirmation apparatuses 4a, 4b, a determination can be made regarding whether wireless communication control devices 2a, 2b and roadside antennas 3a, 3b are operating normally.

Consequently, in accordance with toll collection system 1 according to Embodiment 5, in a free flow type toll collection system, abnormalities can be quickly and accurately detected.

Moreover, in toll collection system 1 according to Embodiment 5, confirmation apparatuses 4a, 4b are disposed within a range in which wireless communication with roadside antennas 3a, 3b via side lobe of roadside antennas 3a, 3b is possible.

Here, as mentioned above, the main lobes of roadside antennas 3a, 3b respectively specify specified communication regions Q1, Q2 on the road surfaces of lanes L1, L2. In this case, it is contemplated that, for example, in a case where confirmation apparatuses 4a, 4b are permanently disposed in the vicinity of roadside antennas 3a, 3b and also within the range of the main lobe, the radiation pattern of this main lobe is influenced (reflected, etc.) by the existence of confirmation apparatuses 4a, 4b, with specified communication regions Q1, Q2 varying from the intended regions.

With that, as in toll collection system 1 according to the present embodiment, in a case where confirmation apparatuses 4a, 4b are disposed at positions in which wireless communication is possible via the side lobe of roadside antennas 3a, 3b, wireless communication processing between roadside antennas 3a, 3b and confirmation apparatuses 4a, 4b can be stably carried out without influencing the main lobe of roadside antennas 3a, 3b itself.

Therefore, without impairing the range of specified communication regions Q1, Q2, that is, the stability of the dedicated short-range communication processing carried out between roadside antennas 3a, 3b and on-board device A1, in accordance with the reception results of the response signal from confirmation apparatuses 4a, 4b, a determination can be made regarding whether wireless communication control devices 2a, 2b and roadside antennas 3a, 3b are operating normally.

Moreover, confirmation apparatuses 4a, 4b according to Embodiment 5 transmit the response signal as a confirmation signal from roadside antennas 3a, 3b in a case where the dedicated short-range communication processing wireless communication control devices 2a, 2b have received the request signal (FCMC signal) transmitted to on-board device A1. Moreover, confirmation apparatuses 4a, 4b transmit a response signal (ACTC signal) based on the same specifications (ARIB standard specifications) as the response signal transmitted by on-board device A1 during dedicated short-range communication processing, as a response signal thereof.

That is, toll collection system 1 according to the present embodiment also uses the FCMC signal and ACTC signal exchanged with on-board device A1 during normal dedicated short-range communication processing, for wireless communication processing for soundness determination carried out between confirmation apparatuses 4a, 4b. In this case, wireless communication control devices 2a, 2b can transmit and receive the confirmation signal and the response signal between confirmation apparatuses 4a, 4b only via existing DSRC processing unit 21.

Therefore, because the need to implement a novel component (hardware) is eliminated in order to carry out wireless communication processing between confirmation apparatuses 4a, 4b and roadside antennas 3a, 3b, a determination can be made regarding whether roadside antennas 3a, 3b are operating normally, while suppressing the increase in production costs of toll collection system 1.

Moreover, confirmation apparatuses 4a, 4b according to Embodiment 5 include an identifier (LID exclusive for the confirmation apparatus) which can identify that the transmission source of this ACTC signal is confirmation apparatuses 4a, 4b in the ACTC signal, which is transmitted if the FCMC signal is received.

As a result, simply by referring to the LID read from the ACTC signal via the dedicated short-range communication processing by DSRC processing unit 21, soundness determination unit for confirmation apparatuses 205 can determine whether this ACTC signal has been transmitted from confirmation apparatuses 4a, 4b.

Modified Example of Embodiment 5

Figure 21:
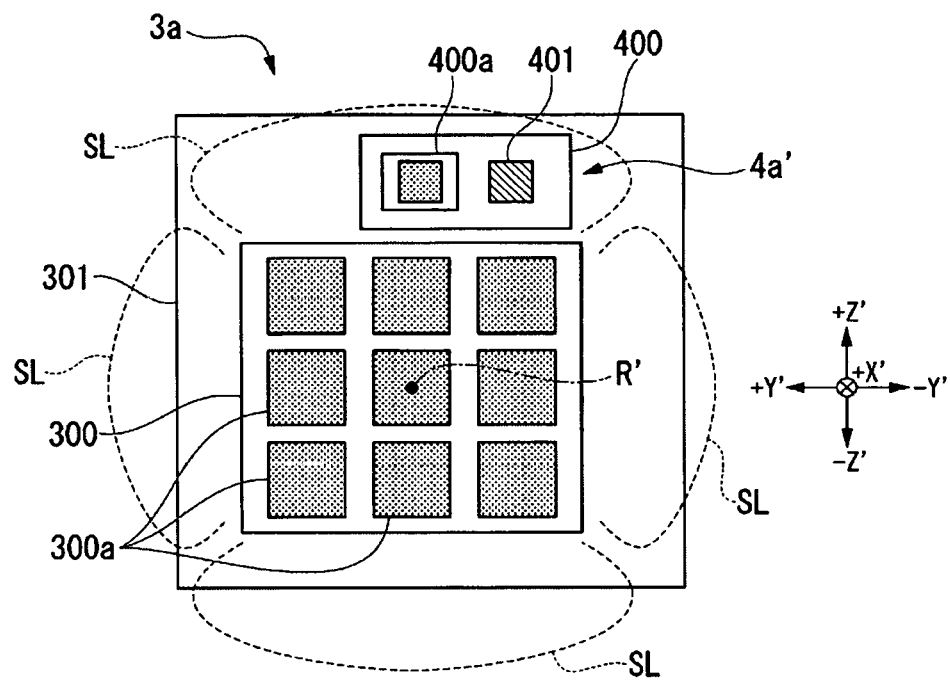
FIG. 21 is a first diagram illustrating the structure of a roadside antenna and a confirmation apparatus according to a modified example of Embodiment 5.

FIG. 21 is a first diagram illustrating the structure of a roadside antenna and a confirmation apparatus according to a modified example of Embodiment 5.

Figure 22:
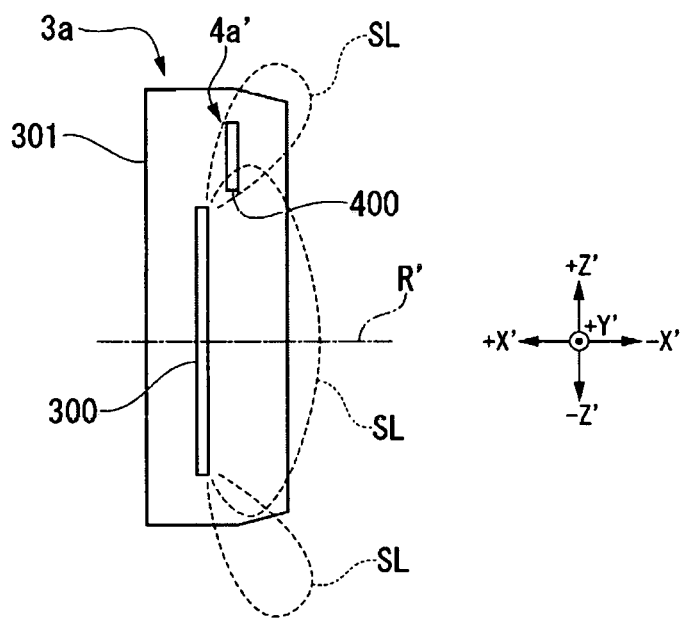
FIG. 22 is a second diagram illustrating the structure of the roadside antenna and the confirmation apparatus according to a modified example of Embodiment 5.

Moreover, FIG. 22 is a second diagram illustrating the structure of the roadside antenna and the confirmation apparatus according to a modified example of Embodiment 5.

Here, FIG. 21 illustrates the state in which the internal structure of roadside antenna 3a is seen from the front face of thereof, while FIG. 22 illustrates the state in which the internal structure of roadside antenna 3a is seen from the side face thereof.

As illustrated in FIGS. 21 and 22, roadside antenna 3a includes: substrate 300 for a patch antenna with patch antenna 300a formed on the plate surface; and radome 301 for covering patch antenna 300a (substrate 300 for a patch antenna).

Moreover, radome 301 of roadside antenna 3a is further formed so as to cover confirmation apparatus 4a'. Here, unlike confirmation apparatus 4a (FIGS. 17 and 18) according to Embodiment 5, confirmation apparatus 4a' according to the present modified example, which is disposed inside radome 301, does not have a radome (cover case) of confirmation apparatus 4a' alone and is simply configured by substrate 400 for a confirmation apparatus with patch antenna 400a and confirmation apparatus processing unit 401 implemented therein. Here, confirmation apparatus processing unit 401 is a communication processing unit for carrying out communication processing as confirmation apparatus 4a' (reading the received FCMC signal and transmitting the ACTC signal).

Patch antenna 300a of roadside antenna 3a is an antenna element of roadside antenna 3a (antenna element 30 illustrated in FIG. 8) which is an element for transmitting and receiving radio waves with on-board device A1.

Patch antenna 300a has a main lobe (not illustrated in FIGS. 21 and 22) in accordance with specified communication region Q1 (FIG. 15) on the road surface of lane L1. Here, the main lobe of patch antenna 300a, for example, is a predetermined range on the front side (−X' direction side)

of the plate surface (Y'Z' plane) of substrate 300 for a patch antenna, with central axis line R' of this plate surface serving as the center.

Moreover, patch antenna 300a includes side lobe SL having a different radiation pattern from the main lobe. For example, as illustrated in FIGS. 21 and 22, with the vicinity of each edge (side) on a rectangular plate surface of substrate 300 for a patch antenna serving as the base end, side lobe SL of patch antenna 300a extends to the front side thereof (−X' direction side) and in a direction moving away from the central axis line R on this plate surface.

Patch antenna 400a of confirmation apparatus 4a' is an antenna element capable for transmitting and receiving radio waves with patch antenna 300a of roadside antenna 3a.

Patch antenna 400a of confirmation apparatus 4a' is disposed at a position capable of receiving radio waves of side lobe SL of patch antenna 300a. For example, confirmation apparatus 4a' (patch antenna 400a) is disposed so as to be inside radome 301 of roadside antenna 3a and also be included within the range of side lobe SL on the upper side of substrate 300 for a patch antenna (+Z' direction side).

Note that in FIGS. 21 and 22, the structure and positional relationship of roadside antenna 3a and confirmation apparatus 4a have been described, while the structure and positional relationship of roadside antenna 3b and confirmation apparatus 4h'(confirmation apparatus disposed inside radome 301 of roadside antenna 3b) are the same as these.

As described above, iii accordance with toll collection system 1 according to a modified example of Embodiment 5, roadside antennas 3a, 3b include: patch antenna 300a for transmitting and receiving radio waves with on-board device A1; and radome 301 for covering this patch antenna 300a, with confirmation apparatuses 4a', 4b' disposed inside radome 301.

As a result, because roadside antennas 3a, 3b and confirmation apparatuses 4a', 4b' can be integrally formed, toll collection system 1 can be simplified. That is, because confirmation apparatuses 4a', 4b' are housed in radome 301 and integrated with roadside antennas 3a, 3b, an attachment operator can attach roadside antennas 3a, 3b with no regard of the existence of confirmation apparatuses 4a', 4b'. Moreover, an attachment operator need not worry about the displacement between confirmation apparatus 3a, 3b and confirmation apparatuses 4a', 4b', etc.

Moreover, housings (cover cases) of confirmation apparatuses 4a', 4b', as well as fixing jigs (attachment jig g1, fixing rod g2, etc.) for attaching these confirmation apparatuses 4a', 4b' outside roadside antennas 3a, 3b, are unnecessary, effectively reducing production costs.

In the foregoing, toll collection system 1 according to Embodiment 5 and a modified example thereof have been described in detail. However, specific aspects of toll collection system 1 according to Embodiment 5 and a modified example thereof are not limited to those described above, with various design modifications, for example, capable of being made without departing from the gist thereof.

For example, while toll collection system 1 according to Embodiment 5 has been described in which confirmation apparatuses 4a, 4b are disposed within a range in which wireless communication with roadside antennas 3a, 3b via the side lobe of roadside antennas 3a, 3b is possible, other embodiments are not limited to this aspect.

For example, other embodiments may include an aspect in which confirmation apparatuses 4a, 4b are disposed within the range of the main lobe of roadside antennas 3a, 3b. In this case, confirmation apparatuses 4a, 4b may be disposed at a position relatively distant from roadside antennas 3a, 3b (for example, within a range of specified communication regions Q1, Q2 on the road surfaces of lanes L1, L2), which is also a position (for example, a roadside band adjacent to lanes L1, L2, etc.) not inhibiting the driving of vehicle A. Moreover, confirmation apparatuses 4a, 4b may be embedded inside the roads of lanes L1, L2.

Moreover, toll collection system 1 according to Embodiment 5 (and the modified example thereof) has been described in which confirmation apparatuses 4a, 4b (confirmation apparatuses 4a', 4b') transmit the response signal as a confirmation signal if the dedicated short-range communication processing wireless communication control devices 2a, 2b have received the FCMC signal transmitted to on-board device A1. Moreover, confirmation apparatuses 4a, 4b (confirmation apparatuses 4a', 4b') have been described as transmitting a response signal (ACTC signal) based on the same specifications as the response signal transmitted by on-board device A1 during dedicated short-range communication processing, as a response signal thereof. However, other embodiments are not limited to this aspect.

For example, confirmation apparatuses 4a, 4b (confirmation apparatuses 4a', 4b') may carry out wireless communication processing between roadside antennas 3a, 3b exclusive for soundness determination (the transmission and reception of a confirmation signal exclusive for soundness determination, and a response signal exclusive for soundness determination) different from narrow band communication.

Moreover, while toll collection system 1 according to Embodiment 5 (and a modified example thereof) has been described in which confirmation apparatuses 4a, 4b (confirmation apparatuses 4a', 4b') select any one period of channels C01 to C12 and transmit the ACTC signal, other embodiments are not limited to this aspect.

For example, this may include an aspect in which confirmation apparatuses 4a, 4b (confirmation apparatuses 4a', 4b') constantly transmit the response signal using only the specific channel (for example, channel C12) exclusive to the response of confirmation apparatuses 4a, 4b (confirmation apparatuses 4a', 4b'). As a result, soundness determination unit for confirmation apparatuses 205 may monitor only the specific channel (channel C12) exclusive to the response of confirmation apparatuses 4a, 4b (confirmation apparatuses 4a', 4b') and determine whether the response signal has been received from confirmation apparatuses 4a, 4b (confirmation apparatuses 4a', 4b'), allowing a reduction in the load of soundness determination processing.

Moreover, processing of DSRC processing unit 21 according to Embodiment 5 (and the modified example thereof), for example, may be carried out as follows.

That is, in a case where DSRC processing unit 21 reads the ACTC signal received following the transmission of the FCMC signal, it refers to the LID contained in this ACTC signal and determines whether this ACTC signal has been transmitted from on-board device A1 or transmitted by confirmation apparatuses 4a, 4b (confirmation apparatuses 4a', 4b'). In a case where the ACTC signal transmitted from on-board device A1 has been received, DSRC processing unit 21 establishes a data link with this on-board device A1 via the subsequent narrow band communication and acquires information for toll collection. In contrast, if the ACTC signal transmitted from confirmation apparatuses 4a, 4b (confirmation apparatuses 4a', 4b') has been received, DSRC processing unit 21 does not establish a data link with confirmation apparatuses 4a, 4b (confirmation apparatus 4a', 4b'), but rather ends the narrow band communication.

This prevents DSRC processing unit 21 from carrying out unnecessary dedicated short-range communication processing with confirmation apparatuses 4a, 4b (confirmation apparatuses 4a', 4b').

Figure 20:
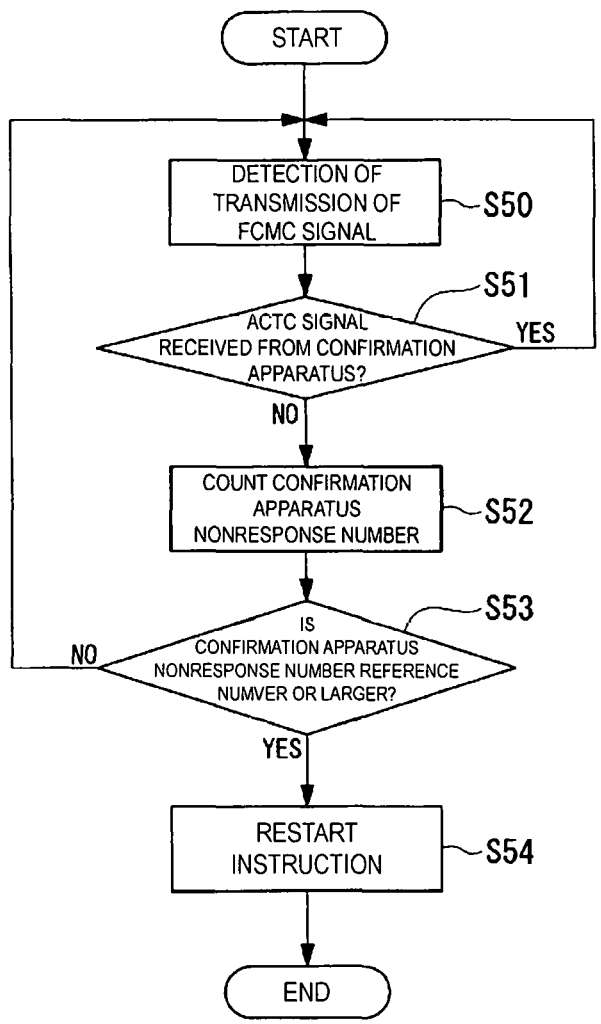
FIG. 20 is a diagram explaining the processing flow of a soundness determination unit for confirmation apparatuses according to Embodiment 5.

Note that Embodiment 5 has been described in which, if soundness determination unit for confirmation apparatuses 205 determines that abnormalities have occurred in at least one of roadside antennas 3a, 3b or DSRC processing unit 21, it instructs roadside antennas 3a, 3b and DSRC processing unit 21 to restart processing (Step S54 of FIG. 20). However, other embodiments are not limited to this aspect.

For example, other embodiments may include an aspect in which, in a case where determination unit 205 for a confirmation apparatus determines that the operation of the target components (roadside antennas 3a, 3b and DSRC processing unit 21) has abnormalities, a monitoring person, etc. residing in a central facility of toll collection system 1, etc. is notified of the abnormalities.

Embodiment 6

Subsequently, a toll collection system according to Embodiment 6 will be described in detail with reference to FIG. 23.

Functional Elements of the Toll Collection System

Figure 23:
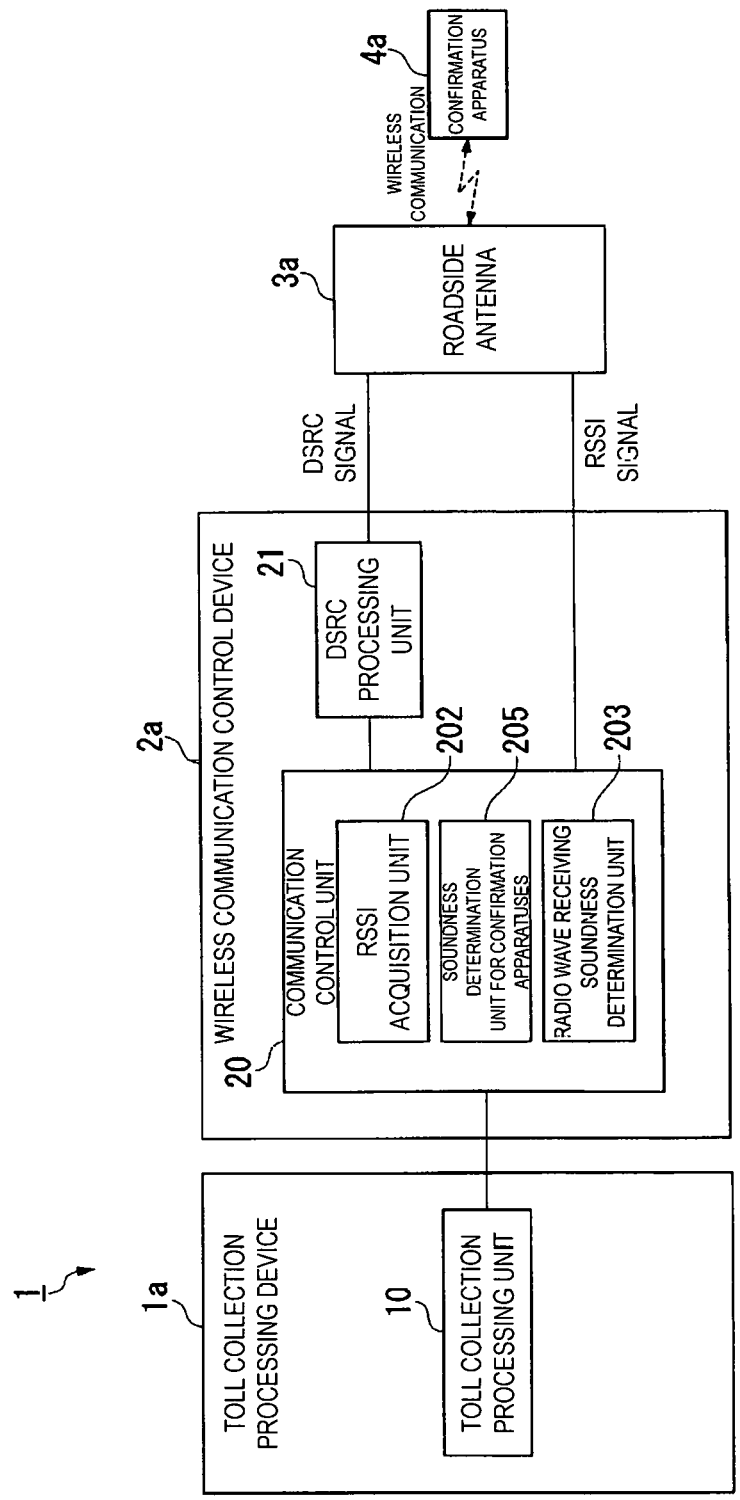
FIG. 23 is a diagram illustrating the functional elements of a toll collection system according to Embodiment 6.

FIG. 23 is a diagram illustrating the functional elements of a toll collection system according to Embodiment 6.

In FIG. 23, the same components as those in Embodiment 5 will be denoted by the same reference symbols, with descriptions thereof omitted.

As illustrated in FIG. 23, toll collection system 1 according to Embodiment 6, as in Embodiment 5, includes toll collection processing device 1a, wireless communication control device 2a, roadside antenna 3a, and confirmation apparatus 4a. Note that toll collection system 1 according to the present embodiment, as in Embodiment 5, further includes wireless communication control device 2b, roadside antenna 3b, and confirmation apparatus 4b (refer to FIG. 16), with the illustration of the configuration thereof omitted.

Wireless communication control device 2a as illustrated in FIG. 25 includes communication control unit 20 along with DSRC processing unit 21.

Moreover, as illustrated in FIG. 25, communication control unit 20 includes RSSI acquisition unit 202 (reception strength acquisition unit), radio wave receiving soundness determination unit 203, and soundness determination unit for confirmation apparatuses 205.

RSSI acquisition unit 202 according to the present embodiment acquires an RSSI signal (reception strength information) indicating the reception strength (RSSI) of radio waves received by roadside antennas 3a, 3b, from roadside antennas 3a, 3b.

Moreover, radio wave receiving soundness determination unit 203 according to the present embodiment determines whether roadside antennas 3a, 3b are operating normally based on whether predetermined reception strength Ic of radio waves indicated in this RSSI signal is lower than reception determination threshold Ich.

Here, in toll collection system 1 according to the present embodiment, for example, as in Embodiment 5, the positional relationship between confirmation apparatuses 4a, 4b and roadside antennas 3a, 3b is fixed using attachment jig g1, fixing rod g2 (FIGS. 17 and 18), etc. Moreover, the strength of radio waves sent by confirmation apparatuses 4a, 4b according to the present embodiment for the transmission of the ACTC signal is fixed.

In this case, in a case where roadside antennas 3a, 3b are operating normally, every time DSRC processing unit 21 transmits the FCMC signal, roadside antennas 3a, 3b must receive radio waves from confirmation apparatuses 4a, 4b at a fixed reception strength.

In this case, radio wave receiving soundness determination unit 203 according to the present embodiment compares preset reception determination threshold Ich with reception strength Ic, which is detected every time the FCMC signal is transmitted. Further, in a case where reception strength Ic, which is detected every time the FCMC signal is transmitted, is lower than reception determination threshold Ich, radio wave receiving soundness determination unit 203 counts the number. In addition, radio wave receiving soundness determination unit 203 determines that roadside antennas 3a, 3b are not operating normally if the number at which reception strength Ic is lower than reception determination threshold Ich reaches a predetermined reference number.

Operational Effects

As described above, wireless communication control devices 2a, 2b according to Embodiment 6 include: RSSI acquisition unit 202 for acquiring the RSSI signal indicating the reception strength of radio waves received by roadside antennas 3a, 3b; and radio wave receiving soundness determination unit 203 for determining whether roadside antennas 3a, 3b are operating normally based on whether reception strength Ic of radio waves indicated in this RSSI signal is lower than reception determination threshold Ich.

As a result, not only based on the presence of the reception of the ACTC signal from confirmation apparatuses 4a, 4b but also based on the reception strength of radio waves overlapped by the ACTC signal, wireless communication control devices 2a, 2b can determine whether roadside antennas 3a, 3b are operating normally. Consequently, the locations of operation abnormalities in toll collection system 1 can be further narrowed down and specified.

In the foregoing, while certain embodiments of the present invention have been described, these embodiments are merely illustrative and not intended to limit the scope of the invention. These embodiments may be implemented in various other forms, with various omissions, substitutions, and alterations capable of being made without departing from the gist of the invention. These embodiments and modifications are included in the scope and gist of the invention and are also included in the scope of the invention described in the claims and equivalents thereof.

INDUSTRIAL APPLICABILITY

The abovementioned toll collection system and soundness determination method enable the provision of a free flow type toll collection system which can detect abnormalities.

REFERENCE SYMBOLS LIST

1 Toll collection system
1a Toll collection processing device
10 Toll collection processing unit
101 Heartbeat processing unit
101a Soundness determination unit
101b Response unit
11 Recording medium
12 System soundness determination unit
2a, 2b Wireless communication control devices
20 Communication control unit
201 Heartbeat processing unit
201a Soundness determination unit 201b Response unit
202 RSSI acquisition unit (reception strength acquisition unit)
203 Radio wave receiving soundness determination unit
204 Communication processing soundness determination unit
205 Soundness determination unit for confirmation apparatuses
21 DSRC processing unit (communication processing unit)
211 Heartbeat processing unit
211a Soundness determination unit
211b Response unit
3a, 3b Roadside antennas
30 Antenna element
31 Amplifier
32 Mixer
33 Reference oscillation source
34 Demodulation processing unit
35 Reception strength detection unit
300 Substrate for a patch antenna
300a Patch antenna
301 Radome
4a, 4b Confirmation apparatuses
4a', 4b' Confirmation apparatuses
400 Substrate for a confirmation apparatus
400a Patch antenna
401 Confirmation apparatus processing unit
A Vehicle
A1 On-board device
Q1, Q2 Specified communication region
G Gantry
L1, L2 Lane
T Communication tower
D Statistical data
P1, P2, P3 Communication pairs
g1 Attachment jig
g2 Fixing rod
SL Side lobe

The invention claimed is:

1. A toll collection system, comprising:
a roadside antenna that wirelessly communicates with an on-board device mounted in a vehicle;
a wireless communication control device that carries out predetermined communication processing with the on-board device via the roadside antenna, acquiring toll collection information regarding the on-board device; and
a confirmation apparatus that is disposed within a range in which wireless communication with the roadside antenna is possible, receiving a confirmation signal from the roadside antenna and transmitting a response signal,
wherein the wireless communication control device determines, based on reception results of the response signal from the confirmation apparatus via the roadside antenna, whether the roadside antenna and the wireless communication control device are operating normally,
wherein the roadside antenna comprises:
an antenna element for transmitting and receiving radio waves with the on-board device; and
a radome covering the antenna element, wherein the confirmation apparatus is disposed inside the radome.

2. The toll collection system according to claim 1, wherein
the confirmation apparatus is disposed within a range in which wireless communication with the roadside antenna via a side lobe of the roadside antenna is possible.

3. The toll collection system according to claim 1, wherein the confirmation apparatus transmits the response signal as the confirmation signal in a case where, during the communication processing, the wireless communication control device receives a predetermined request signal which is transmitted to the on-board device via the roadside antenna.

4. The toll collection system according to claim 3, wherein the confirmation apparatus includes an identifier configured to identify the fact that the transmission source of the response signal is the confirmation apparatus in the response signal, which is transmitted if the request signal is received.

5. The toll collection system according to claim 1, wherein the wireless communication control device includes:
a reception strength acquisition unit for acquiring reception strength information indicating the reception strength of radio waves received by the roadside antenna; and
a radio wave receiving soundness determination unit for determining whether the roadside antenna is operating normally based on whether the reception strength of radio waves indicated in the reception strength information is lower than a predetermined reception determination threshold.

6. A soundness determination method for determining the soundness of a toll collection system, the toll collection system including:
a roadside antenna that wirelessly communicates with an on-board device mounted in a vehicle;
a wireless communication control device that carries out predetermined communication processing with the on-board device via the roadside antenna; and
a confirmation apparatus that receives a confirmation signal from the roadside antenna and transmits a response signal, acquiring toll collection information regarding the on-board device, the method comprising:
receiving the confirmation signal from the roadside antenna via a side lobe of the roadside antenna and transmitting the response signal by the confirmation apparatus; and
determining, based on the reception results of the response signal from the confirmation apparatus via the roadside antenna, whether the roadside antenna and the wireless communication control device are operating normally by the wireless communication control device,
wherein the roadside antenna comprises:
an antenna element for transmitting and receiving radio waves with the on-board device; and a radome covering the antenna element, and
wherein the confirmation apparatus is disposed inside the radome.

7. A toll collection system, comprising:
a roadside antenna that wirelessly communicates with an on-board device mounted in a vehicle;
a wireless communication control device that carries out predetermined communication processing with the on-board device via the roadside antenna, acquiring toll collection information regarding the on-board device; and a confirmation apparatus that is disposed within a range in which wireless communication with the roadside antenna is possible, receiving a confirmation signal from the roadside antenna and transmitting a response signal, wherein the wireless communication control device determines, based on the reception results of the response signal from the confirmation apparatus via the roadside antenna, whether the roadside antenna and the wireless communication control device are operating normally, and wherein the confirmation apparatus is attached above the roadside antenna and attached to a tip of a fixing rod which extends from a back side of the roadside antenna to a front side of the roadside antenna when seen from a side face of the roadside antenna, the front side of the roadside antenna being a radiation direction of radio waves from the roadside antenna.

* * * * *